United States Patent [19]

Hayase et al.

[11] Patent Number: 5,362,559
[45] Date of Patent: Nov. 8, 1994

[54] POLYSILANE MONOMOLECULAR FILM AND POLYSILANE BUILT-UP FILM

[75] Inventors: Shuji Hayase, Kawasaki; Yoshihiko Nakano, Tokyo; Yukihiro Mikogami; Akira Yoshizumi, both of Yokohama; Shinji Murai; Rikako Kani, both of Yokohama, all of Japan

[73] Assignee: Kabushiki Kaisha Toshiba, Kawasaki, Japan

[21] Appl. No.: 89,634

[22] Filed: Jul. 12, 1993

Related U.S. Application Data

[63] Continuation of Ser. No. 858,216, Mar. 26, 1992, abandoned.

[30] Foreign Application Priority Data

Mar. 26, 1991 [JP] Japan .................................. 3-062037
Oct. 24, 1991 [JP] Japan .................................. 3-278029
Oct. 24, 1991 [JP] Japan .................................. 3-278030
Oct. 24, 1991 [JP] Japan .................................. 3-278031

[51] Int. Cl.⁵ .............................................. B32B 5/00
[52] U.S. Cl. ........................................ 428/333; 528/26; 528/27; 528/28; 528/42; 528/43; 525/474
[58] Field of Search ..................... 528/42, 43, 26, 27, 528/28; 525/474; 428/333

[56] References Cited

U.S. PATENT DOCUMENTS 4,745,169  5/1988  Sugiyama et al. .................... 528/43
4,871,646  10/1989  Hayase et al. ....................... 525/474

FOREIGN PATENT DOCUMENTS 0231497  12/1987  European Pat. Off. .
0403662  12/1990  European Pat. Off. .
3817306  12/1988  Germany .
63-113021  4/1988  Japan .

OTHER PUBLICATIONS

Database WPIL, AN 90-302376, JP-A-2-214-738, Aug. 27, 1990, "Polysilane Thin Film Organic Function Device Preparation Adsorb Straight Organic Molecular Contain Tri Methoxy Silyl Tri Chloro Silyl Group Silicon Substrate".

F. W. Embs, et al: "Preparation of Oriented Mono and Multilayers of Poly(Bis-Butoxyphenylsilnae) By the Langmuir-Blodgett-Technique" pp. 298-299.

*Primary Examiner*—Melvyn I. Marquis
*Attorney, Agent, or Firm*—Oblon, Spivak, McClelland, Maier & Neustadt

[57] ABSTRACT

Disclosed are a polysilane monomolecular film and a polysilane built-up film formed by building up a plurality of said monomolecular films, said monomolecular film consisting of a polysilane having a repeating unit represented by general formula (1) given below:

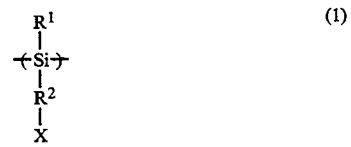

where, $R^1$ represents a substituted or unsubstituted alkyl group having 1 to 24 carbon atoms or a substituted or unsubstituted aryl group having 6 to 24 carbon atoms, $R^2$ represents a divalent hydrocarbon group having 1 to 4 carbon atoms which can be substituted, and X represents hydroxyl group, amino group, carboxyl group, or a hydrophilic group having at least one selected from the group consisting of hydroxyl group, amino group, carboxyl group, amide linkage, ester linkage, carbamate linkage and carbonate linkage. The polysilane monomolecular film and built-up film can be formed on a substrate by an LB technique. In the films, the molecules of the polysilane having the repeating unit (1), that is, the Si-Si backbones are oriented in a fixed direction.

38 Claims, 1 Drawing Sheet

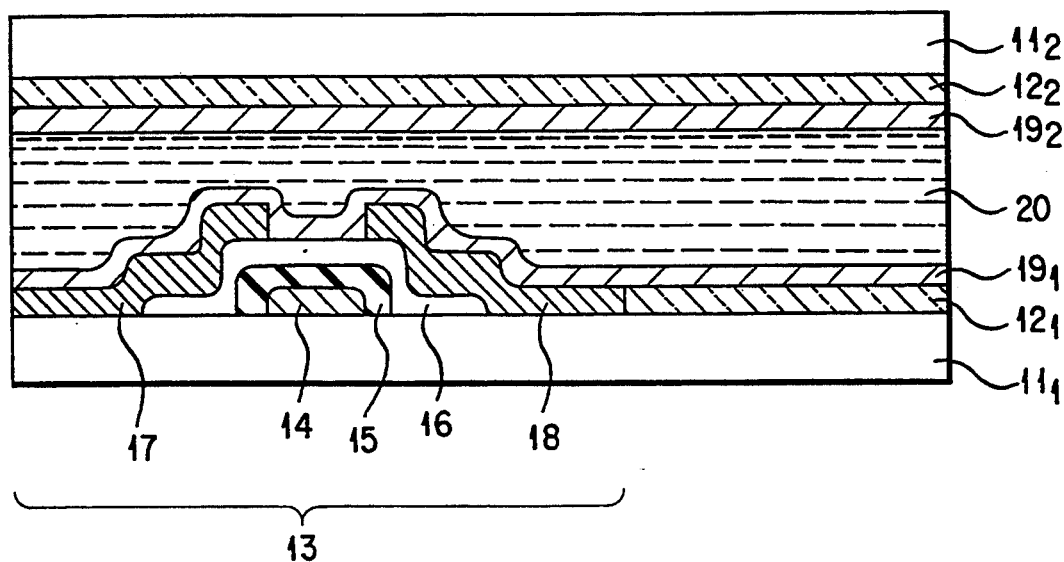
F I G. 1

POLYSILANE MONOMOLECULAR FILM AND POLYSILANE BUILT-UP FILM

This application is a continuation of application Ser. No. 07/858,216, filed on Mar. 26, 1992, now abandoned.

BACKGROUND OF THE INVENTION

1. Field of the Invention

The present invention relates to a polysilane monomolecular film and polysilane built-up film which can be used as various materials such as a material of a layer for migrating holes and electric charges, that is to say, a hole-charge-transfer layer, a light sensitive material used in a photolithography, a non-linear optical material, a piezoelectric material, and a pyroelectric material.

2. Description of the Related Art

Vigorous researches are being made in an attempt to achieve application of a polysilane in various fields including, for example, an electrically conductive material, a precursor material of ceramics, a photoconductive material, a semiconductor material and a nonlinear optical material. Nowadays, a polysilane is a substance of deep interest in the industries.

A polysilane is generally used in the form of a thin film as the material described above. A spin coating method is widely employed for forming a polysilane thin film. In the conventional spin coating method, a polysilane having a Si-Si backbone, that is to say, a Si-Si main chain is dissolved in an organic solvent so as to prepare a polymer solution. A desired substrate is coated with the polymer solution by using a spinner, followed by evaporating the solvent so as to form a polysilane thin film.

However, the conventional spin coating method is poor in its capability of controlling the structure of the formed thin film. Particularly, where a polysilane thin film having a thickness of 0.1 μm or less is formed on a substrate by the conventional spin coating method, the resultant thin film lacks in uniformity and regularity of the molecular orientation.

SUMMARY OF THE INVENTION

The present invention has been achieved in view of the situation described above, and is intended to provide a polysilane thin film excellent in uniformity and regularity of the molecular orientation.

According to one embodiment of the present invention, there is provided a polysilane monomolecular film comprising a polysilane having a repeating unit represented by general formula (1) given below:

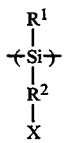
(1)

where $R^1$ represents a substituted or unsubstituted alkyl group having 1 to 24 carbon atoms, or a substituted or unsubstituted aryl group having 6 to 24 carbon atoms; $R^2$ represents a divalent hydrocarbon group having 1 to 24 carbon atoms which can be substituted; and X represents hydroxyl group, amino group, carboxyl group or a hydrophilic group having at least one selected from the group consisting of hydroxyl group, amino group, carboxyl group, amide linkage, ester linkage, carbamate linkage and carbonate linkage.

According to a second embodiment of the present invention, there is provided a polysilane built-up film formed by building up a plurality of the polysilane monomolecular films, each of the monomolecular films comprising a polysilane having a repeating unit represented by general formula (1) given above.

The polysilane monomolecular film and the polysilane built-up film can be formed as a polysilane thin film having a desired thickness and desired characteristics by suitably controlling the conditions in the film-forming process.

In the present invention, each of the monomolecular film and the built-up film formed by building up a plurality of the monomolecular films comprises a polysilane having a repeating unit represented by general formula (1). It should be noted that the polysilane has the specific hydrophilic group X in one of the side chains bonded to the Si-Si backbone, and the specific hydrophobic group $R^1$ as the other side chain. It follows that the polysilane used in the present invention is amphipathic. Preferably, the hydrophilic group X should be capable of forming a hydrogen bond and, thus, includes, for example, a hydroxyl group.

In the polysilane monomolecular film of the present invention, an intermolecular hydrogen bond represented by general formula (2) given below and another intermolecular hydrogen bond represented by general formula (3) given below are formed in the polysilane molecule forming the monomolecular film, leading to an improved strength of the film in a direction of the Si-Si backbone chain and in a direction perpendicular to the direction of the Si-Si backbone chain.

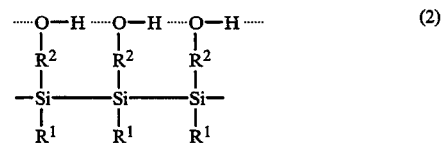

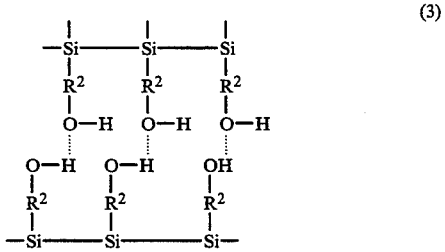

It should also be noted that the polysilane molecules are packed by the hydrogen bond with a regularity. Further, the molecules of polysilane used in the present invention exhibit a polymer liquid crystal property, with the result that the polysilane molecules are arranged with a high regularity over the entire region of the film. It follows that the polysilane monomolecular film of the present invention exhibits excellent properties in, particularly, a two-dimensional regularity, uniformity and mechanical strength.

On the other hand, the polysilane built-up film of the present invention is formed by building up a plurality of the polysilane monomolecular films described above. In the built-up film of the present invention, an intermolecular hydrogen bond is also formed between monomolecular films which are in contact with each other. It follows that the polysilane built-up film of the present invention permits improving the properties in the thickness direction of the film, too. In other words, the built-up film of the present invention exhibits excellent properties in, particularly, the three-dimensional regularity, uniformity and mechanical strength.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a cross sectional view showing the construction of the picture element portion included in a liquid crystal display device using the polysilane monomolecular film or polysilane built-up film of the present invention as an orientating film.

DETAILED DESCRIPTION OF THE PREFERRED EMBODIMENTS

The polymers and copolymers exemplified in Table A can be used in the present invention as amphipathic polysilanes having a repeating unit (1). These polysilanes having a repeating unit (1) can be synthesized without difficulty by the method described in "Macromolecules, 22 (1989), page 2933" and "Macromolecules, 21 (1988), page 304". When it comes to, for example, a polysilane in which "X" in the repeating unit (1) is hydroxyl group or the group having hydroxyl group, a dichlorosilane derivative having a hydroxyl group protected by a silyl group is subjected to a polycondensation reaction with metallic sodium within an organic solvent, followed by removing the protective group by means of hydrolysis so as to obtain the desired polysilane.

On the other hand, reaction is carried out between the polysilane noted above, i.e., the polysilane having a hydroxyl group in the side chain, and a suitable compound such as an amine compound or an isocyanate compound in the case of synthesizing a polysilane in which "X" in the repeating unit (1) represents a hydrophilic group having an ester linkage, (OCOR), a carbonate linkage (OCOOR) or a carbamate linkage (OCONHR), in which R represents a monovalent organic group. In this case, however, unreacted hydroxyl groups unavoidably remain in the side chains of the synthesized polysilanes. In other words, substantially obtained is a copolymer containing repeating units (1) in which "X" is hydroxyl group or the group having hydroxyl group and other repeating units (1) in which "X" is a hydrophilic group having a linkage derived from the hydroxyl group, which is the ester linkage or the like noted above. It is possible to synthesize copolymers of desired compositions by suitably controlling the reacting conditions so as to provide the compolymers listed in, for example, Table A.

In forming the polysilane monomolecular film and the built-up film of the present invention, it is possible to use polysilanes partially substituted by the compounds exemplified below and by a compound forming a charge transfer complex such as a porphyrin compound or viologen compound in addition to the polysilane having a repeating unit (1) noted above.

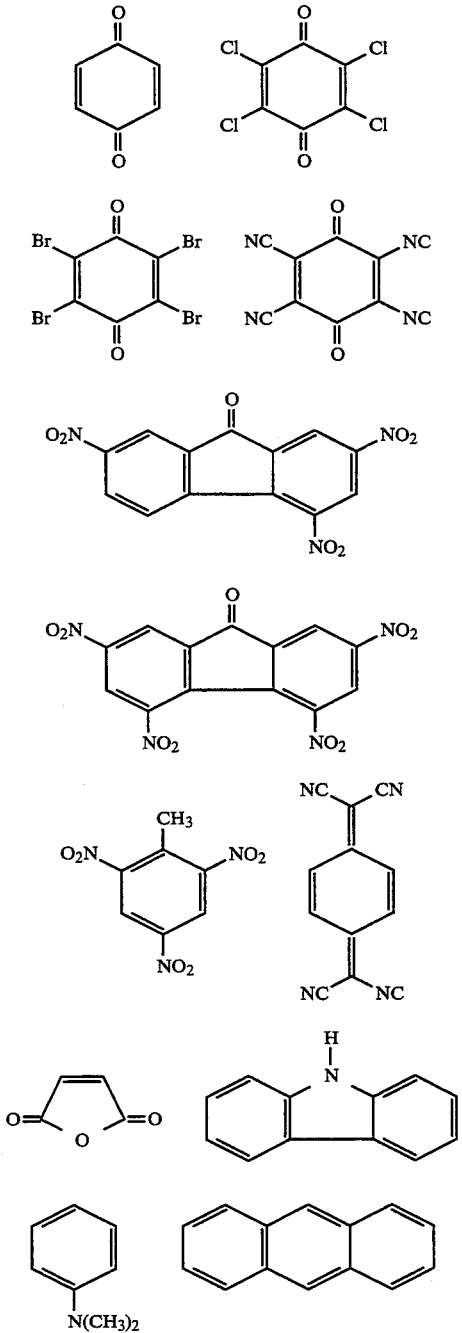

The substituted polysilanes which can be used in the present invention are exemplified in Table B. In the case of using the substituted polysilane, it is possible for the substituted polysilane and the polysilane having a repeating unit (1) to form a copolymer or a simple mixture. In the polysilane monomolecular film or built-up film formed by using the polysilane copolymer or mixture noted above, the molecules forming the film are polarized by the compound forming the charge transfer complex. It follows that the polysilane monomolecular film or built-up film thus formed is particularly suitable for use as a layer for migrating holes and charges.

It is possible to employ various film-forming processes known to the art for manufacturing the polysilane monomolecular film and the built-up film of the present invention. Particularly, it is desirable to employ an LB technique (Langmuir-Blodgett technique), which utilizes amphipathic property of the polysilane having a repeating unit (1), so as to form an LB monomolecular film or an LB built-up film.

In the LB technique, a polysilane having a repeating unit (1) is dissolved in a suitable organic solvent, followed by dripping the resultant polymer solution onto a liquid material such as water so as to spread the polymer solution on the liquid material. In this case, the polysilane dripped onto the liquid surface is oriented such that the hydrophilic group, i.e., the group X included in the repeating unit (1), is in direct contact with the liquid surface, and the hydrophobic group, i.e., the group $R^1$ included in the repeating unit (1), is positioned away from the liquid surface. Because of the particular orientation, it is possible to obtain a very stable polysilane monomolecular film.

The monomolecular film thus formed is compressed to have a predetermined surface pressure, and the surface area of the monomolecular film is controlled to maintain constant the surface pressure. Under this condition, a substrate having, for example, a hydrophobic treatment applied thereto in advance is dipped into the liquid in a direction perpendicular to the surface of the monomolecular film, followed by pulling the substrate upward. When the substrate is dipped into the liquid on which the monomolecular film is formed and/or when the substrate is pulled upward, the monomolecular film is transferred onto the substrate so as to form an LB monomolecular film having a monomolecular layer of the polysilane having a repeating unit (1) fixed to the substrate. The operation described above is repeatedly performed several times so as to form an LB built-up film having a plurality of the LB monomolecular films of the polysilane superposed one upon the other on the substrate. It is possible to use a general LB film-forming apparatus for forming the polysilane monomolecular film and the built-up film by the LB technique.

As described previously, the polysilane having a repeating unit (1) is amphipathic. Thus, in the case of employing the LB technique, a very stable polysilane monomolecular film is formed on the liquid surface. Then, the orientation and arrangement of the polysilane molecules are controlled with a high regularity, making it possible to form a satisfactory LB monomolecular film or LB built-up film on the substrate. Further, intramolecular and intermolecular hydrogen bonds are formed in the polysilane film, as described previously. It follows that a synergetic effect is produced by the LB technique and the hydrogen bonds formed in the polysilane film so as to further improve the uniformity and regularity of the LB polysilane monomolecular film and built-up film, particularly where the film has a thickness of 0.1 $\mu$m or less.

In forming the polysilane monomolecular film or built-up film of the present invention by the LB technique, it is desirable to use a polysilane having a repeating unit (1), e.g., the polysilanes listed in Table A. Particularly, it is desirable to use a polysilane in which a fluorine atom or a fluorine-containing group is substituted for at least one hydrogen atom included in the hydrophobic group $R^1$ of the repeating unit (1). The fluorine atom makes the hydrophobic group $R^1$ more strongly hydrophobic, with the result that a very stable monomolecular film of the polysilane can be formed on the liquid surface because of the function of the hydrophobic group $R^1$ and the hydrophilic group X bonded to the side chain on the opposite side. It follows that the polysilane molecules are oriented and arranged with a higher regularity in the resultant LB monomolecular film and the built-up film.

In forming the polysilane monomolecular film or built-up film of the present invention by the LB technique, it is also desirable to use a polysilane having a repeating unit (1), e.g., the polysilanes listed in Table A. For example, it is desirable to use a polysilane in which the hydrophobic group $R^1$ represents a substituted or unsubstituted alkyl group having 4 to 24 carbon atoms. In the case of using a polysilane having the particular hydrophobic group, a shearing stress is generated when the substrate is pulled upward from the liquid surface in the LB technique, with the result that the polysilane molecules, that is, the Si-Si backbones are strongly oriented along the pulling direction. It follows that the resultant LB monomolecular film or the LB built-up film can be a thin film constructed such that the polysilane molecules are uniformly oriented along one direction within the film.

The polysilane monomolecular film or built-up film of the present invention can be used in combination with another organic or inorganic thin film so as to provide a thin film element of a high performance. Particularly, it is desirable to use the monomolecular film or built-up film comprising a polysilane having a repeating unit (1) in combination with another organic thin film having organic molecules capable of performing an electronic mutual function together with the Si-Si backbone of the polysilane. An organic thin film element can be provided by constructing a multi-layer structure comprising the polysilane monomolecular films or the built-up films and other organic thin films In arbitrary order. The organic thin film element exhibits an excellent function, for example, a function which allows the element to be adapted for use as a layer for migrating holes and electric charges.

To be more specific, the organic thin film element noted above is manufactured in general by a process comprising a step of superposing these two kinds of the thin films, that is to say, each of the polysilane monomolecular films or built-up films and each of the other organic thin films one upon the other, in arbitrary order, on a substrate. For example, the two different kinds of the thin films are alternately superposed one upon the other so as to manufacture the desired element. The polysilane monomolecular film or built-up film included in these two kinds of the thin films is formed by the LB technique using a solution prepared by dissolving the polysilane in an organic solvent. The LB technique can also be employed for forming the other kind of the organic thin film. Alternatively, a CVD (chemical vapor deposition) method can be employed for forming the particular organic thin film. In manufacturing the organic thin film element, the monomolecular film or built-up film of a polysilane is formed first on a substrate, for example, by the LB technique, followed by forming the other organic thin film on the polysilane film by the LB technique or CVD method so as to form a laminated structure comprising the two different kinds of the thin films. Alternatively, the particular organic thin film may be formed first in direct contact with the substrate, followed by forming the polysilane monomolecular film or built-up film on the organic thin film. It is also possible to carry out a plurality of times the alternate operation of forming the polysilane monomolecular film or built-up film by the LB technique and forming the particular organic thin film by the LB technique or CVD method so as to form a laminated structure comprising of a plurality of pairs of the polysilane film and the other organic thin film on the substrate.

As described previously, the organic thin film included in the organic thin film element has an organic molecule capable of performing an electronic mutual function together with the Si-Si backbone of the polysilane having a repeating unit (1). The particular organic thin film is formed of, for example, a compound having $\pi$-electrons or a compound having a lone pair. The specific compounds having such $\pi$-electrons or a lone pair include, for example, a metal phthalocyanine, a non-metal phthalocyanine, an azo dye such as a monoazo dye and a bisazo dye, a perylene series pigment, a indigoid dye, a quinacridone pigment, anthraquinones, polycyclic quinones, a cyanine dye, a xantene dye, polyvinyl carbazol, trinitro fluorenone, a pyrylium salt, a hydrazone compound, a pyrazoline compound, an oxazole compound, an oxadiazole compound, a thiazole compound, an imino compound, a ketazine compound, an enamine compound, an amidine compound, a stylbene compound, a butadiene compound, a carbazole compound, 7,7,8,8-tetracyano quinone dimethane (TCNQ), and the compound of the chemical structure given below:

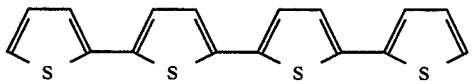

In the organic thin film element of this type, excellent uniformity and regularity of molecules are achieved within the polysilane monomolecular film or built-up film. As described previously, the organic thin film element comprises a polysilane thin film and an organic thin film containing organic molecules capable of performing an electronic mutual function together with the Si-Si backbone of the polysilane. The particular structure permits improving the performances of the thin film element such as an electrical conductivity and mobility of electrical charges and holes. Further, it is considered reasonable to suppose that superlattices may be formed by the mutual function in the molecule level between these two kinds of thin films in direct contact with each other.

A thin film element having a multi-layer structure can be also manufactured by a process comprising a step of laminating the polysilane monomolecular films or built-up film of the present invention and another inorganic thin films in arbitrary order. The thin film element of this type also exhibits excellent characteristics. In manufacture the thin film element of this type, the polysilane monomolecular film or built-up is formed by the LB technique. On the other hand, the inorganic thin film is formed by the LB technique or the general method such as a CVD method. The specific inorganic materials used for forming the inorganic thin film include, for example, silicon, selenium, CdS, CdSe, ZeO, ZnO and CdSSe.

The polysilane monomolecular film and built-up film of the present invention are adapted for use as an orientating film in a liquid crystal display element. In other words, the polysilane film of the present invention is adapted for use as a film for controlling the state of orientation of liquid crystal molecules. In general, a liquid crystal display element comprises a pair of substrates disposed a predetermined distance apart from each other in a manner to face each other, orientating films covering the mutually facing surfaces of these substrates, and a liquid crystal sealed in a free space formed between the orientating films. The polysilane monomolecular film or built-up film of the present invention can be used as the orientating covering the surface of at least one of these substrates.

To be more specific, the monomolecular film or built-up film of polysilane having a repeating unit (1) is formed by, preferable, an LB technique on one surface of a substrate having a transparent electrode and a driving element mounted thereon. A pair of substrates having the polysilane film formed on the surface are disposed a predetermined distance apart from each other such that the polysilane films on the substrates are positioned to face each other. Further, a liquid crystal is sealed in the free space formed between the mutually facing polysilane films so as to manufacture a liquid crystal display element of the construction described above.

It should be noted that, in the polysilane monomolecular film or built-up film formed on the substrate, the Si-Si backbones of the polysilane molecules are oriented and orderly arranged, for example, along the pulling direction of the substrate in the step of forming the polysilane film by the LB technique. Further, a large polarization is provided in the direction of the Si-Si backbone. It follows that the sealed liquid crystal molecules are strongly oriented along the direction of the Si-Si backbone in the liquid crystal display element using the polysilane monomolecular film or built-up film of the present invention. What should be noted is that a particular treatment need not be applied to the substrate surface in the case of a liquid crystal display element using the polysilane monomolecular film or built-up film of the present invention. In other words, the polysilane film of the present invention exhibits an excellent performance as an orientating film, i.e., permits controlling the orientation of the liquid crystal molecules with a high order without assistance of the particular treatment applied in general to the substrate surface.

Polysilanes other than those having a repeating unit (1) can also be used for forming a thin film which can be used as an orientating film in a liquid crystal display element, provided that a suitable orientation treatment, that is, one developing capability of orientating liquid crystal molecules, is applied to the thin film. For example, it is possible to use a thin film of an organic polysilane having a Si-Si backbone. In the case of applying an orientation treatment to the thin film, the film need not be restricted to a monomolecular film or built-up film. The polysilanes which cannot be represented by the repeating unit (1) are listed in Table C.

To be more specific, a liquid crystal display element comprising a thin film of an organic polysilane can be prepared as follows. In the first step, an organic polysilane having a Si-Si backbone is dissolved in an organic solvent, followed by coating one surface of a substrate having a transparent electrode and a driving element formed thereon with the resultant polymer solution. In the coating step, it is possible to employ, for example, a roll coater method or a spin coater method. After the coating step, the substrate is dried on a hot plate or by a drying machine so as to form a polysilane thin film having a predetermined thickness. Where the thin film is formed of a polysilane having a repeating unit (1), it is possible to irradiate the thin film with light so as to achieve crosslinking of polysilane molecules and, thus, to improve the mechanical strength of the thin film.

In the next step, an orientation treatment are applied to the polysilane thin film. The orientation treatment applied in this step include, for example, a rubbing treatment in which the thin film surface is rubbed with a roller covered with a fibrous material, and a stretching treatment in which the polysilane thin film is stretched by a mechanical treatment. It is considered reasonable to understand that, in the case of the rubbing treatment, fine irregularities formed on the surface of the polysilane film facilitate the orientation of the liquid crystal molecules. In the case of the stretching treatment, the Si-Si backbones of the polysilane molecules are considered to be oriented with a regularity and a uniformity so as to control the capability of orientating the liquid crystal molecules. A pair of the substrates after the orientation treatment are arranged a predetermined distance apart from each other such that the polysilane thin films are positioned to directly face each other, followed by sealing a liquid crystal in the free space between the mutually facing polysilane thin films so as to manufacture a desired liquid crystal display element.

It should be noted that the polysilane thin film is semiconductive, with the result that generation of a static electricity can be suppressed in the step of forming the polysilane thin film on a substrate and in the step of applying an orientation treatment, particularly a rubbing treatment, to the polysilane film. It follows that the substrate and the active element formed thereon can be prevented from being stained or distracted by the action of static electricity. It should be noted in particular that static electricity is generated in a large amount by the rubbing treatment in the case of using an insulative polymer film as an orientating film, giving rise to serious problems. Needless to say, the polysilane thin film permits overcoming these problems. What should also be noted is that an orientating film comprising a polysilane permits suppressing the accumulation of electric charges, making it possible to prevent the occurrence of charge up. It follows that it is possible to suppress the disturbance in the orientation of the liquid crystal molecules.

Further, it should be noted that the polysilane thin film absorbs light at the visible region very little, with the result that the orientating film comprising the polysilane exhibits high transparency in comparison with the insulative polymer film such as a polyimide film. It follows that a liquid crystal display, which is manufactured by using the element comprising the polysilane film as an orientating film, is excellent in visibility of a displayed picture.

As described above, a thin film formed of an organic polysilane having a Si-Si backbone exhibits an excellent performance when used as an orientating film in a liquid crystal display element, provided that a suitable orientation treatment is applied to the thin film. In other words, it is possible to enable a thin film of an organic polysilane having a Si-Si backbone to be suitably used as an orientating film in a liquid crystal display element by appropriately selecting the method of forming the film, an orientation treatment applied to the thin film, etc.

FIG. 1 shows a liquid crystal display element comprising an orientating film comprising a thin film of an organic polysilane having a Si-Si backbone. To be more specific, FIG. 1 is a cross sectional view showing the construction of the picture element portion of a liquid crystal display element. It should be noted that the liquid crystal display element shown in the drawing is used in a display system called a active matrix type. As shown in the drawing, the display element comprises substrates $11_1$ and $11_2$ each formed of, for example, glass, a transparent electrode $12_1$ (display electrode) formed on the substrate $11_1$, and another transparent electrode $12_2$ (scanning electrode) formed on the substrate $11_2$. Each of these electrodes is formed of, for example, ITO (indium tin oxide). Further, a thin film transistor (TFT) 13 is mounted to the substrate 111 connected to the transparent electrode $12_1$. The TFT 13 comprises a gate electrode 14 formed on the substrate $11_1$ and covered with a gate insulating film 15. A semiconductor layer 16 is formed on the gate insulating film 15. Further, a source electrode 17 and a drain electrode 18 are respectively connected to predetermined regions on the semiconductor layer 16.

It is seen that an orientating film $19_1$ is formed to cover the surfaces of the transparent electrode $12_1$ and the TFT 13. On the other hand, another orientating film $19_2$ formed on the surface of the transparent electrode $12_2$. As apparent from the drawing, these orientation films $19_1$ and $19_2$ are positioned to face each other with a free space provided therebetween. Of course, a liquid crystal 20 is sealed in the free space between the orientation films $19_1$ and $19_2$.

In the liquid crystal display element of the construction described above, a thin film formed of an organic polysilane having a Si-Si backbone is used as at least the orientating film $19_1$, i.e., the orientating film covering the substrate 111 having a driving element such as a TFT mounted thereon. It is also desirable to use a similar organic polysilane thin film as the orientating film $19_2$ covering the surface of the other substrate $11_2$.

Let us describe Examples of the present invention together with Comparative Examples. Some compounds are denoted by symbols in these Examples and Comparative Examples. Table D shows the chemical structures of the compounds denoted by the symbols.

EXAMPLE 1

3.5 g of metallic sodium was dispersed in 100 ml of toluene. Then, a solution prepared by dissolving 32.1 g of compound M-1 in 100 ml of toluene having a temperature of 100° C. was dripped into the sodium dispersion so as to carry out reaction at 110° C. for one hour. After the reaction, the unreacted sodium and sodium chloride, etc. were removed by means of filtration, and the resultant filtrate was concentrated under reduced pressure. Then, 200 ml of methanol was added to the concentrate, and the resultant system was stirred for one hour and the insoluble materials were removed by means of filtration. Further, the filtrate was concentrated and poured into toluene so as to obtain a white polymer. The white polymer thus obtained was refined five times in a similar manner. The resultant product was dissolved again in methanol and, then, dripped into water so as to remove a salt and permit precipitation of the product. The operation for removing a salt described above was repeated five times, followed by drying the final product under reduced pressure so as to obtain polysilane P-1 having an average molecular weight of 200,000.

In the next step, 30 mg of the polysilane P-1 was dissolved in one liter of cyclohexanone, followed by spreading the resultant polymer solution on the surface of water so as to form a monomolecular film. Then, a silicon wafer substrate was dipped into the water in a direction perpendicular to the water surface (or the surface of the monomolecular film), followed by pulling the substrate upward so as to transfer the monomolecular film onto the substrate and, thus, to form an LB monomolecular film.

The LB monomolecular film thus formed was subjected to measurements of polarized UV absorption in the pulling direction of the substrate and in the direction perpendicular to said pulling direction. The UV absorption in the pulling direction was found to be greater than that in the direction perpendicular to the pulling direction. The result of the measurements indicates that Si-Si backbones of the polysilane P-1 are oriented along the pulling direction of the substrate.

EXAMPLE 2

The polysilane P-1 synthesized in Example 1 was dissolved in 100 ml of tetrahydrofuran (THF), followed by adding a solution prepared by dissolving 0.04 mol of triethyl amine and 0.1 mol of maleic anhydride in 100 ml of THF to the resultant solution. The solution thus prepared was poured into a dilute aqueous solution of hydrochloric acid so as to obtain polysilane P-2 having an average molecular weight of 200,000.

In the next step, 30 mg of the polysilane P-2 was dissolved in one liter of cyclohexanone. Then, an LB monomolecular film of the polysilane P-2 was formed on the substrate by using the polymer solution as in Example 1.

The LB monomolecular film thus prepared was subjected to measurements of polarized UV absorption in the pulling direction of the substrate and in the direction perpendicular to said pulling direction. The UV absorption in the pulling direction was found to be greater than that in the direction perpendicular to the pulling direction. The result of the measurements indicates that Si-Si backbones of the polysilane P-2 are oriented along the pulling direction of the substrate.

EXAMPLE 3

3.5 g of metallic sodium was dispersed in 100 ml of toluene, followed by adding 32 g of compound M-2 to the dispersion so as to carry out reaction between sodium and the compound M-2 at 100° C. for one hour. After the reaction, the unreacted sodium and sodium chloride, etc. were removed by means of filtration, and the filtrate was concentrated under reduced pressure, as in Example 1. The concentrate liquid was poured into methanol so as to refine the synthesized polymer.

One gram of the polymer was dissolved in 200 ml of THF and 5 cc of a 1M solution of n-Bu$_4$NF was added to the resultant solution so as to carry out reaction at room temperature for 10 minutes and, thus, to decompose isopropyldimethylsilyl group. The reaction product was washed with a dilute aqueous solution of hydrochloric acid so as to obtain polysilane P-3 having an average molecular weight of 7,000.

In the next step, 30 mg of the polysilane P-3 was dissolved in one liter of cyclohexanone. Then, an LB monomolecular film of the polysilane P-3 was formed on the substrate by using the polymer solution as in Example 1.

The LB monomolecular film thus formed was subjected to measurements of polarized UV absorption in the pulling direction of the substrate and in the direction perpendicular to the pulling direction. An anisotropy in the UV absorption was found, indicating that Si-Si backbones of the polysilane P-3 were oriented along the pulling direction within the monomolecular film.

EXAMPLE 4

3.5 g of metallic sodium was dispersed in 100 ml of toluene, followed by adding 32 g of compound M-3 to the dispersion so as to carry out reaction between sodium and the compound M-3 at 100° C. for one hour. After the reaction, the unreacted sodium, sodium chloride, etc. were removed by means of filtration, and the filtrate was concentrated under reduced pressure, as in Example 1. The concentrate was poured into methanol so as to refine the synthesized polymer PX-1.

One gram of the polymer PX-1 was dissolved in 200 ml of THF, and 5 cc of a 1M solution of n-Bu$_4$NF was added to the resultant solution so as to carry out reaction at room temperature for 10 minutes and, thus, to decompose t-butyldimethylsilyl group. The reaction product was washed with a dilute aqueous solution of hydrochloric acid so as to obtain polysilane P-4 having an average molecular weight of 250,000.

In the next step, 30 mg of the polysilane P-4 was dissolved in one liter of cyclohexanone. Then, an LB monomolecular film of polysilane P-4 was formed on the substrate by using the polymer solution as in Example 1.

The LB monomolecular film thus formed was subjected to measurements of polarized UV absorption in the pulling direction of the substrate and in the direction perpendicular to the pulling direction. An anisotropy in the UV absorption was found, indicating that Si-Si backbones of the polysilane P-3 were oriented along the pulling direction within the monomolecular film.

COMPARATIVE EXAMPLE 1

30 mg of the polymer PX-1 synthesized in Example 4 was dissolved in one liter of cyclohexanone. Then, an LB monomolecular film of the polymer PX-1 was formed on the substrate by using the polymer solution as in Example 1.

The LB monomolecular film thus formed was subjected to measurements of polarized UV absorption in the pulling direction of the substrate and in the direction perpendicular to the pulling direction. However, an anisotropy was not found in the UV absorption, indicating that Si-Si backbones of the polymer PX-1 were not oriented in a particular direction within the monomolecular film.

EXAMPLE 5

Polysilane P-1 having an average molecular weight of 200,000 was synthesized as in Example 1.

In the next step, 30 mg of the polysilane P-1 was dissolved in one liter of cyclohexanone, and the resultant polymer solution was spread on the surface of water so as to form a monomolecular film. Then, a silicon wafer substrate was dipped into the water in a direction perpendicular to water surface (i.e., the surface of the monomolecular film), followed by pulling up the substrate. This operation was performed repeatedly.

The monomolecular film was found to be built-up on the substrate only when the substrate was pulled up. To be more specific, the particular operation was repeatedly carried out 10 times so as to build up ten layers of the monomolecular film on the substrate with a high reproducibility.

The surface of the polysilane built-up film (LB built-up film) thus formed was observed with an SEM. The polysilane built-up film was found to be free of defects and uniform.

Further, the polysilane built-up film thus formed was exposed to an electron beam through a patterning mask, followed by development with a 0.6% aqueous solution of tetramethylammonium hydroxide, whereby a pattern was formed. The pattern thus formed had a high resolution, of 0.2 μm (line and space). This experiment clearly supports that the polysilane built-up film according to the present invention can be used satisfactorily as a resist film in PEP (i.e., photo engraving process).

EXAMPLE 6

Polysilane P-2 having an average molecular weight of 200,000 was synthesized as in Example 2.

In the next step, 30 mg of the polysilane P-2 was dissolved in one liter of cyclohexanone. A polysilane built-up film (LB built-up film) having a thickness of about 300 Å was formed on the substrate by using the polymer solution of the polysilane P-2 as in Example 5.

The surface of the polysilane built-up film thus formed was observed with SEM. The polysilane built-up film was found to be free of defects and substantially uniform. Further, three dimensional non-linear optical characteristics of the polysilane built-up film were measured, obtaining a result of $x^{(3)}=2.0\times10^{-12}$ esu. This indicates that the polysilane built-up film according to the present invention can be used in a non-linear optical element.

EXAMPLE 7

Polysilane P-3 having an average molecular weight of 7,000 was synthesized as in Example 3.

In the next step, 30 mg of the polysilane P-3 was dissolved in one liter of cyclohexanone. A polysilane built-up film (LB built-up film) having a thickness of about 500 Å was formed on the surface of a substrate by using the polymer solution of polysilane P-3 as in Example 5.

The surface of the polysilane built-up film thus formed was observed with SEM. The polysilane built-film was found to be free of defects and substantially uniform. Further, the mobility of holes was measured by the time-of-flight method with respect to the polysilane built-up film, obtaining a result of $10^{-5}cm^2/V.sec$. This indicates that the polysilane built-up film according to the present invention performs a satisfactory function of a layer for migrating holes.

EXAMPLE 8

135 g of m-(i-propeny) phenol and 160 g of t-butyldimethylsilyl chloride were dissolved in 500 g of an anhydrous ether, followed by adding 101 g of triethylamine to the resultant solution. The reaction solution was subjected to a reflex operation for 3 hours, followed by removing the formed salt by means of filtration. Further, the filtrate was concentrated, and, then, distilled so as to obtain compound G-1. Still further, reaction was carried out at 150° C. for 3 hours among 248 g of the compound G-1, 197 g of compound S-1, and 5 g of chloroplatinic acid. The reaction mixture was distilled so as to obtain compound M-4.

In the next step, 5.0 g of metallic sodium was dispersed in 100 ml of toluene, followed by adding a solution prepared by dissolving 44.5 g of the compound M-4 in 100 ml of toluene at 65° C. to the resultant dispersion. The reaction was carried out for 4 hours so as to polymerize the compound M-4. After the reaction, the insoluble matters such as the unreacted sodium and sodium chloride, etc. were removed by means of filtration, and the filtrate was concentrated under reduced pressure. The concentrate was poured into methanol so as to refine the synthesized polymer.

10 g of the polymer was dissolved in 500 ml of THF (tetrahydrofuran), and 54 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-5 having the repeating unit (1) described above, said polysilane P-5 having an average molecular weight of 12,000.

3.74 g of the polysilane P-5 was dissolved in 100 ml of THF, followed by dripping a solution prepared by dissolving 1.01 g of triethylamine and 1.00 g of compound F-1 in 100 ml of THF into the polymer solution at room temperature. After completion of the dripping, the polymer solution was poured into water so as to obtain a white polymer. The while polymer was dried and, then, dissolved in methanol. Further, the resultant polymer solution was dripped into toluene so as to refine the polymer. Still further, the refined polymer was dried and, then, dissolved in methanol, followed by dripping the resultant solution into water so as to precipitate the polymer. Finally, the precipitated polymer was sufficiently washed with water so as to obtain polysilane PF-1.

30 mg of the polysilane PF-1 was dissolved in one liter of cyclohexanone, and the resultant polymer solution was spread on the surface of water so as to form a monomolecular film. Then, a silicon wafer substrate was dipped in the water in a direction perpendicular to the water surface (i.e., the surface of the monomolecular film), followed by pulling up the substrate in the direction perpendicular to the water surface. This operation was carried out repeatedly so as to from an LB polysilane built-up film comprising 12 layers of the polysilane (PF-1) monomolecular films on the substrate.

The surface of the polysilane built-up film thus formed was observed with SEM. The built-up film was found to be free of defects and substantially uniform.

EXAMPLE 9

171 g of m-bromophenol and 160 g of t-butyldimethylsilyl chloride were dissolved in 500 g of an anhydrous ether, followed by adding 101 g of triethylamine to the resultant solution. The reaction system was subjected to a reflux operation for 3 hours, followed by removing the formed salt by means of filtration. Further, the filtrate was concentrated and, then, distilled so as to obtain compound G-3. Still further, a Grignard reagent synthesized from 285 g of the compound G-3 and 24 g of Mg within an ether was dripped into 240 g of S-2. After completion of the dripping, the system was subjected to a reflux operation for 4 hours. Further, the formed salts were removed by means of filtration, and the filtrate was concentrated, followed by distilling the concentrate under reduced pressure so as to obtain compound M-5.

In the next step, 5.0 g of metallic sodium was dispersed in 100 ml of toluene, followed by adding a solution prepared by dissolving 43.7 g of the compound M-5 in 100 ml of toluene at 65° C. to the resultant dispersion. The reaction was carried out for 4 hours so as to polymerize the compound M-5. After the reaction, the insoluble matters such as the unreacted sodium and sodium chloride were removed by means of filtration, and the filtrate was concentrated under reduced pressure. The concentrate was poured into methanol so as to refine the synthesized polymer.

10 g of the polymer was dissolved in 500 ml of THF (tetrahydrofuran), and 55 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-6 having the repeating unit (1), said polysilane P-6 having an average molecular weight of 15,000.

3.74 g of polysilane P-6 was dissolved in 100 ml of THF, followed by dripping a solution prepared by dissolving 1.01 g of triethylamine and 1.40 g of compound F-2 in 100 ml of THF into the polymer solution at room temperature. After completion of the dripping, the polymer solution was poured into water so as to obtain a white polymer. The while polymer was dried and, then, dissolved in methanol. Further, the resultant polymer solution was dripped into toluene so as to refine the polymer. Still further, the refined polymer was dried and, then, dissolved in methanol, followed by dripping the resultant solution into toluene so as to refine the polymer. Finally, the polymer was dried, dissolved in methanol and, then, dripped into water so as to precipitate the polymer followed by sufficiently washing the precipitated polymer so as to obtain polysilane PF-2.

30 mg of the polysilane PF-2 was dissolved in one liter of cyclohexanone, and the resultant polymer solution was spread on the surface of water so as to form a monomolecular film. Further, a polysilane built-up film having a thickness of 200 Å, in which monomolecular films of the polysilane PF-2 were built up, was formed on the substrate by means of the LB technique, as in Example 8.

The surface of the polysilane built-up film thus formed was observed with SEM. The built-up film was found to be free of defects and substantially uniform.

EXAMPLE 10

3.5 g of metallic sodium was dispersed in 100 ml of toluene, followed by adding 32 g of compound M-6 to the resultant dispersion at 65° C. The reaction was carried out for 1 hour so as to polymerize the compound M-6. After the reaction, the insoluble mattes such as the unreacted sodium and sodium chloride were removed by means of filtration, and the filtrate was concentrated under reduced pressure. The concentrate was poured into methanol so as to refine the synthesized polymer.

One gram of the polymer was dissolved in 200 ml of THF, and 5 cc of a 1M THF solution of tetrabutylammonium fluoride was added to the polymer solution. The reaction was carried out for 10 minutes at room temperature so as to decompose 1-propyldimethylsilyl group. The reaction mixture was washed with a dilute aqueous solution of hydrochloric acid, and the separated THF layer was concentrated. The reaction product was then dripped into toluene so as to obtain polysilane P-7 having the repeating unit (1), said polysilane P-7 having an average molecular weight of 7,000.

3.55 g of the polysilane P-7 was dissolved in 100 ml of THF, followed by dripping a solution prepared by dissolving 2.64 g of compound F-3, 63 g of 18 crown, and 1.38 g of potassium carbonate in 100 ml of THF into the polymer solution. The reaction solution thus prepared was kept stirred for 24 hours at room temperature. Then, the polymer solution was poured into water so as to obtain a precipitate. The precipitate was dried and, then, dissolved in toluene, followed by dripping the toluene solution into ethanol so as to obtain polysilane PF-3.

30 mg of the polysilane PF-3 was dissolved in one liter of cyclohexanone, and the resultant polymer was spread on the surface of water so as to form a monomolecular film. Then, a polysilane built-up film, in which 15 layers of the polysilane monomolecular films were built up was formed on the substrate by the LB technique as in Example 8.

The surface of the polysilane built-up film thus formed was observed with SEM. The built-up film was found to be free of defects and substantially uniform. Further, the mobility of holes with respect to the polysilane built-up film was measured by the time-of-flight method, obtaining a result of $10^{-4}cm^2V/sec$. This clearly supports that the polysilane built-up film according to the present invention is adapted a layer for migrating holes.

Still further, a three dimensional non-linear susceptibility of the polysilane built-up film was measured, obtaining a result of $10^{-11}$ esu. In other words, it has been confirmed that the polysilane built-up film exhibits satisfactory non-linear optical characteristics.

EXAMPLE 11

171 g of m-bromophenol and 160 g of t-butyldimethylsilyl chloride were dissolved in 500 g of an anhydrous ether, followed by adding 101 g of triethylamine to the resultant solution. The reaction system was subjected to a reflux operation for 3 hours, followed by removing the formed salt by means of filtration. Further, the filtrate was concentrated and, then, distilled so as to obtain compound G-3. Still further, a Grignard reagent synthesized from 285 g of the compound G-3 and 24 g of Mg within an ether was dripped into 381 g of S-3. After completion of the dripping, the system was subjected to a reflux operation for 4 hours. Further, the formed salts were removed by means of filtration, and the filtrate was concentrated, followed by distilling the concentrate under reduced pressure so as to obtain compound M-7.

In the next step, 5.0 g of metallic sodium was dispersed in 100 ml of toluene, followed by adding a solution prepared by dissolving 55.3 g of the compound M-7 in 100 ml of toluene at 65° C. to the resultant dispersion. The reaction was carried out for 4 hours so as to polymerize the compound M-7. After the reaction, the insoluble matters such as the unreacted sodium and sodium chloride were removed by means of filtration, and the filtrate was concentrated under reduced pressure. The concentrate was poured into methanol so as to refine the synthesized polymer.

10 g of the polymer was dissolved in 500 ml of THF (tetrahydrofuran), and 54 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-8 having the repeating unit (1), said polysilane P-8 having an average molecular weight of 15,000.

4.8 g of the polysilane P-8 was dissolved in 100 ml of THF, followed by dripping a solution prepared by dissolving 1.2 g of phenyl isocyanate (F-4) and 0.2 ml of tetraethylamine in 100 ml of THF into the polymer solution at room temperature so as to carry out reaction at room temperature for 3 hours. After completion of the reaction, the polymer solution was poured into water so as to obtain a precipitate. The precipitate was dried and, then, dissolved in toluene. Further, the resultant polymer solution was dripped into ethanol so as to obtain polysilane PF-4.

30 mg of the polysilane PF-4 was dissolved in one liter of cyclohexanone, and the resultant polymer solution was spread on the surface of water so as to form a monomolecular film. On the other hand, a monomolecular film of TCNQ (7,7,8,8-tetracyanoquinonedimethane) was formed separately. Further, a laminated structure, in which 20 monomolecular films of the polysilane PF-4 and 20 monomolecular films of TCNQ were alternately superposed one upon the other, was formed on the substrate by means of the LB technique, as in Example 8.

The surface of the laminated structure thus formed was observed with SEM. The built-up film was found to be free of defects and substantially uniform. Further, the electrical conductivity of the laminated structure film was found to be $10^{-4}\Omega\text{cm}$.

EXAMPLE 12

181 g of 6-bromol-hexanol (G-4) and 160 g of t-butyldimethylsilylchloride were dissolved in 500 g of an anhydrous ether, followed by adding 101 g of triethylamine to the resultant solution. The solution was then refluxed for 3 hours, followed by removing the formed salt by means of filtration. Further, the filtrate was concentrated and distilled so as to obtain compound G-5. Still further, a Grignard reagent within an ether, said Grignard reagent being synthesized from 295 g of the compound G-5 and 24 g of Mg within an ether, was dripped into 240 g of S-3. After completion of the dripping, the system was subjected to reflux operation for 4 hours. Further, the formed salt was removed by means of filtration, and the filtrate was concentrated and, then, distilled under reduced pressure so as to obtain compound M-8.

In the next step, 5.0 g of metallic sodium was dispersed in 100 ml of toluene, followed by adding a solution prepared by dissolving 56.2 g of the compound M-8 in 100 ml of toluene at 65° C. to the resultant dispersion. The reaction was carried out for 4 hours so as to polymerize the compound M-8. After the reaction, the insoluble matters such as the unreacted sodium and sodium chloride were removed by means of filtration, and the filtrate was concentrated under reduced pressure. The concentrate was poured into methanol so as to refine the synthesized polymer.

10 g of the polymer was dissolved in 500 ml of THF, and 54 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-9 having the repeating unit (1), said polysilane P-9 having an average molecular weight of 12,000.

4.9 g of the polysilane P-9 was dissolved in 100 ml of THF, followed by dripping a solution prepared by dissolving 1.2 g of phenyl isocyanate (F-4) and 0.2 ml of tetraethylamine in 100 ml of THF into the polymer solution so as to carry out reaction for 3 hours at room temperature. After completion of the reaction, the polymer solution was poured into water so as to obtain a precipitate. The precipitate was dried and, then, dissolved in toluene. Further, the resultant polymer solution was dripped into ethanol so as to so as to obtain polysilane PF-5.

30 mg of the polysilane PF-5 was dissolved in one liter of cyclohexanone, and the resultant polymer solution was spread on the surface of water so as to form a monomolecular film. Further, a polysilane built-up film, in which 20 monomolecular films of the polysilane PF-5 were built up, was formed on the substrate by means of the LB technique, as in Example 8.

The surface of the polysilane built-up film thus formed was observed with SEM. The built-up film was found to be free of defects and substantially uniform. Also, the mobility of holes with respect to the built-up film was measured by the time-of-flight method, obtaining a value of $10^{-4}\text{cm}^{-2}/\text{V.sec}$. In other words, it has found that the polysilane built-film according to the present invention is suitable for use as a layer for migrating holes.

Still further, the three dimensional non-linear susceptibility of the polysilane built-up film was measured. It has been found that the value in the pulling direction of the substrate in the LB technique was $10^{-11}$ esu, and the value in the direction perpendicular to the pulling direction noted above was $10^{-13}$ esu. Accordingly, the polysilane built-up film of the present invention is found to exhibit with respect to the three dimensional non-linear susceptibility.

EXAMPLE 13

135 g of m-(i-propenyl) phenol and 160 g of t-butyldimethylsilyl chloride were dissolved in 500 g of an anhydrous ether, followed by adding 101 g of triethylamine to the resultant solution. The solution was then refluxed for 3 hours, followed by removing the formed salt by means of filtration. Further, the filtrate was concentrated and distilled so as to obtain compound G-1. Still further, a reaction was carried out among 248 g of the compound G-1, 157 g of the compound S-4 and 5 g of choroplatinic acid at 150° C. for 3 hours, followed by distilling the reaction mixture so as to obtain compound M-9.

In the next step, 5.0 g of metallic sodium was dispersed in 100 ml of toluene, followed by adding a solution prepared by dissolving 40.5 g of the compound M-9 in 100 ml of toluene at 65° C. to the resultant dispersion. The reaction was carried out for 4 hours so as to polymerize the compound M-9. After the reaction, the insoluble matters such as the unreacted sodium and sodium chloride were removed by means of filtration, and the filtrate was concentrated under reduced pressure. The condensed filtrate was poured into methanol so as to refine the synthesized polymer.

10 g of the polymer was dissolved in 500 ml of THF (tetrahydrofuran), and 54 cc of a 1M THF solution of tetrabutylammonium was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-10 having the repeating unit (1), said polysilane P-10 having an average molecular weight of 12,000.

In the next step, 30 mg of the polysilane P-10 was dissolved in one liter of cyclohexanone, and the resultant polymer solution was spread on the surface of water so as to form a monomolecular film. Then, a silicon water substrate was dipped in the water in a direction perpendicular to the water surface (i.e., the surface of the monomolecular film), followed by pulling up the substrate from the water. The operations were carried out repeatedly so as to from an LB polysilane built-up film comprising 12 layers of polysilane P-10 monomolecular films on the substrate.

The absorption of polarized UV having a wavelength of 335 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane P-10 forming the polysilane built-up film are oriented along the pulling direction of the substrate in the LB technique.

EXAMPLE 14

3.34 g of polysilane P-10 was dissolved in 100 ml of THF, followed by dripping a solution prepared by dissolving 1.01 g of triethylamine and 1.00 g of compound F-1 in 100 ml of THF into the resultant solution. After completion of the dripping, the polymer solution was poured into water so as to obtain a white polymer. The white polymer was dried and, then, dissolved in methanol, followed by dripping the resultant solution into water so as to allow the polymer to precipitate. The precipitated polymer was sufficiently washed in water so as to obtain polysilane PF-6 having the repeating unit (1).

30 mg of the polysilane PF-6 was dissolved in one liter of cyclohexanone, and the resultant polymer solution was spread on the surface of water so as to form a monomolecular film. Further, a polysilane built-up film, in which 15 monomolecular films of the polysilane PF-6 were built up, was formed on the substrate by means of the LB technique, as in Example 13.

The surface of the polysilane built-up film thus formed was observed with SEM. The built-up film was found to be free of defects and substantially uniform.

Further, the absorption of polarized UV having a wavelength of 335 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of polysilane PF-6 forming the polysilane built-up film are oriented along in the pulling direction of the substrate in the LB technique.

EXAMPLE 15

171 g of m-bromophenol (G-2) and 160 g of t-butyldimethylsilyl chloride were dissolved in 500 g of an anhydrous ether, followed by adding 101 g of triethylamine to the resultant solution. The solution was then refluxed for 3 hours, followed by removing the formed salt by means of filtration. Further, the filtrate was concentrated and distilled so as to obtain compound G-3. Still further, a Grignard reagent within an ether, said Grignard reagent being synthesized from 285 g of the compound G-3 and 24 g of Mg within an ether, was dripped into 220 g of S-5. After completion of the dripping, the system was subjected to reflux operation for 4 hours. Further, the formed salt was removed by means of filtration, and the filtrate was concentrated and, then, distilled under reduced pressure so as to obtain compound M-10.

In the next step, 5.0 g of metallic metal sodium was dispersed in 100 ml of toluene, followed by adding a solution prepared by dissolving 39.0 g of the compound M-10 in 100 ml of toluene at 65° C. to the resultant dispersion. The reaction was carried out for 4 hours so as to polymerize the compound M-10. After the reaction, the insoluble matters such as the unreacted sodium and sodium chloride were removed by means of filtration, and the filtrate was concentrated under reduced pressure. The concentrate was poured into methanol so as to refine the synthesized polymer.

10 g of the polymer was dissolved in 500 ml of THF, and 55 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-3 having a repeating unit (1), said polysilane P-3 having an average molecular weight of 150,000.

30 mg of the polysilane P-3 was dissolved in one liter of cyclohexanone, and the resultant polymer solution was spread on the surface of water so as to form a monomolecular film. Further, a polysilane built-up film having a thickness of 200 Å, in which the monomolecular films of the polysilane P-3 were built up, was formed on the substrate by means of the LB technique, as in Example 13.

The surface of the polysilane built-up film thus formed was observed with SEM. The built-up film was found to be free of defects and substantially uniform.

The absorption of polarized UV having a wavelength of 340 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane P-3 forming the polysilane built-up film are oriented along the pulling direction of the substrate in the LB technique.

EXAMPLE 16

3.19 g of polysilane P-3 was dissolved in 100 ml of THF, followed by dripping a solution prepared by dissolving 1.01 g of triethylamine and 1.19 g of phenyl isocyanate (F-4) into the resultant solution at room temperature. After completion of the dripping, the polymer solution was poured into water so as to obtain a white polymer. The white polymer was dried and, then, dissolved in methanol, followed by dripping the resultant solution into water so as to allow the polymer to precipitate. The precipitated polymer was sufficiently washed water so as to obtain polysilane PF-7 having the repeating unit (1).

30 mg of the polysilane PF-7 was dissolved in one liter of cyclohexanone, and the resultant polymer solution was spread on the surface of water so as to form a monomolecular film. Further, a polysilane built-up film having a thickness of 200 Å, in which the monomolecular films of the polysilane PF-7 were built up, was formed on the substrate by means of the LB technique, as in Example 13.

The surface of the polysilane built-up film thus formed was observed with SEM. The built-up film was found to be free of defects and substantially uniform.

Further, the absorption of polarized UV having a wavelength of 340 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane PF-7 forming the built-up film are oriented along the pulling direction of the substrate in the LB technique.

EXAMPLE 17

A Grignard reagent within an ether, said Grignard reagent being synthesized from 285 g of the compound G-3 and 24 g of Mg within an ether, was dripped into 190 g of S-6. After completion of the dripping, the system was subjected to reflux operation for 4 hours. Further, the formed salt was removed by means of filtration, and the filtrate was concentrated and, then, distilled under reduced pressure so as to obtain compound M-3.

In the next step, 5.0 g of metallic sodium was dispersed in 100 ml of toluene, followed by adding a solution prepared by dissolving 36 g of the compound M-3 in 100 ml of toluene at 65° C. to the resultant dispersion. The reaction was carried out for 4 hours so as to polymerize the compound M-3. After the reaction, the insoluble materials such as the unreacted sodium and sodium chloride were removed by means of filtration, and the filtrate was concentrated under reduced pressure. The concentrate was poured into methanol so as to refine the synthesized polymer.

One gram of the polymer was dissolved in 200 ml of THF, and 5 cc of a 1M THF solution of tetrabutylammonium fluoride in THF was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-4 having the repeating unit (1), said polysilane P-4 having an average molecular weight of 250,000.

30 mg of the polysilane P-4 was dissolved in one liter of cyclohexanone, and the resultant polymer solution was spread on the surface of water so as to form a monomolecular film. Further, a polysilane built-up film having a thickness of 200 Å, in which the monomolecular films of the polysilane P-4 were built up, was formed on the substrate by means of the LB technique, as in Example 13.

The surface of the polysilane built-up film thus formed was observed with SEM. The built-up film was found to be free of defects and substantially uniform.

The absorption of polarized UV having a wavelength of 340 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane P-4 forming the polysilane built-up film are oriented along the pulling direction of the substrate in the LB technique.

EXAMPLE 18

171 g of p-bromophenol (G-2) and 160 g of t-butyldimethylsilyl chloride were dissolved in 500 g of an anhydrous ether, followed by adding 101 g of triethylamine to the resultant solution. The solution was then refluxed for 3 hours, followed by removing the formed salt by means of filtration. Further, the filtrate was concentrated and distilled so as to obtain compound G-6. Still further, a Grignard reagent within an ether, said Grignard reagent being synthesized from 285 g of the compound G-6 and 24 g of Mg with an ether, was dripped into 381 g of S-3. After completion of the dripping, the system was subjected to reflux operation for 4 hours. Further, the formed salt was removed by means of filtration, and the filtrate was concentrated and, then, distilled under reduced pressure so as to obtain compound M-11.

In the next step, 5.0 g of metallic sodium was dispersed in 100 ml of toluene, followed by adding a solution prepared by dissolving 55.3 g of compound M-11 in 100 ml of toluene at 65° C. to the resultant dispersion. The reaction was carried out for 4 hours so as to polymerize compound M-11. After the reaction, the insoluble matters such as the unreacted sodium and sodium chloride were removed by means of filtration, and the filtrate was concentrated under reduced pressure. The concentrate was poured into methanol so as to refine the formed polymer.

10 g of the polymer thus prepared was dissolved in 500 ml of THF, and 54 cc of a 1M THF solution of tetrabutylammonium fluoride was added to the polymer solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was then dripped into toluene so as to obtain polysilane P-11 having the repeating unit (1), said polysilane P-11 having an average molecular weight of 15,000.

30 mg of the polysilane P-11 was dissolved in one liter of cyclohexanone, and the resultant polymer solution was spread on the surface of water so as to form a monomolecular film. Further, a polysilane built-up film having a thickness of 200 Å, in which the monomolecular films of the polysilane P-11 were built up, was formed on the substrate by means of the LB technique, as in Example 13.

The surface of the polysilane built-up film thus formed was observed with SEM. The built-up film was found to be free of defects and substantially uniform.

The absorption of polarized UV having a wavelength of 303 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane P-11 forming the polysilane built-up film are oriented along the pulling direction of the substrate in the LB technique.

Further, the three dimensional non-linear susceptibility of the polysilane built-up film was measured. It has been found that the value in the pulling direction of the substrate in the LB technique was $2 \times 10^{-11}$ esu, and the value in the direction perpendicular to the pulling direction noted above was $2 \times 10^{-13}$ esu. In other words, the polysilane built-up film was found to exhibit an anisotropy in the three dimensional non-linear susceptibility.

EXAMPLE 19

4.8 g of polysilane P-11 was dissolved in 100 ml of THF, followed by dripping a solution prepared by dissolving 1.2 g of phenyl isocyanate (F-4) and 0.2 ml of tetraethylamine into the resultant solution. The reaction was carried out for 3 hours at room temperature. After the reaction, the polymer solution was poured into water so as to obtain a precipitate. The precipitate was dried and, then, dissolved in toluene. Further, resultant solution was dripped into ethanol so as to obtain polysilane (PF-8) having a repeating unit (1).

In the next step, 30 mg of the polysilane PF-8 was dissolved in one liter of cyclohexanone, and the resultant polymer solution was spread on the surface of water so as to form a monomolecular film. On the other hand, a monomolecular film of TCNQ was formed on the water surface. Further, a laminated structure comprising 20 layers of the monomolecular films of the polysilane PF-8 and 20 layers of the TCNQ films, which were alternately laminated one upon the other such that a polysilane monomolecular film is in direct contact with a TCNQ monomolecular film, was formed by the LB technique, as in Example 13.

The surface of the laminated structure was observed with SEM. The built-up film was found to be free of defects and substantially uniform.

EXAMPLE 20

181 g of 6-bromol-hexanol and 160 g of t-butyldimethylsilyl chloride were dissolved in 500 g of a dehydrated ether, followed by dripping 101 g of triethylamine to the resultant solution. Then, the system was subjected to a reflux operation for 3 hours, followed by removing the formed salt by means of filtration. The filtrate was concentrated and distilled so as to obtain compound G-5. Further, a Grignard reagent within an ether, said Grignard reagent being synthesized from 295 g of the compound G-5 and 24 g of Mg within ether, was dripped into 220 g of S-5. After completion of the dripping, the system was subjected to a reflux operation for 4 hours. Further, the formed salt was removed by means of filtration. The filtrate was concentrated and, then, distilled under reduced pressure so as to obtain compound M-12.

In the next step, 5.0 g of metallic sodium was dispersed in 100 ml of toluene, followed by dripping a solution prepared by dissolving 28.6 g of the compound M-12 in 100 ml of toluene at 65° C. into the dispersion. Under this condition, reaction was carried out for 4 hours so as to polymerize the compound M-12. After the reaction, the insoluble matters such as the unreacted sodium and sodium chloride were removed by means of filtration, and the filtrate was concentrated under reduced pressure. The concentrate was poured into methanol so as to refine the synthesized polymer.

In the next step, 10 g of the polymer was dissolved in 500 ml of THF, followed by adding 54 cc of a 1M THF solution of tetrabutylammonium fluoride to the resultant solution. The reaction was carried out for 10 minutes at room temperature so as to decompose t-butyldimethylsilyl group. The reaction mixture was washed with a dilute aqueous solution of hydrochloric acid, and the separated THF layer was concentrated. The reaction product was dripped into toluene so as to obtain polysilane P-12 having the repeating unit (1), said polysilane P-12 having an average molecular weight of 12,000.

In the next step, 30 mg of the polysilane P-12 was dissolved in one liter of cyclohexanone, and the resultant polymer solution was spread on the surface of water so as to form a monomolecular film. Further, a polysilane built-up film, in which of 20 layers of the monomolecular films of the polysilane P-12 were built up, was formed by the LB technique, as in Example 13.

The surface of the built-up film was observed with SEM. The built-up film was found to be free of defects and substantially uniform.

Further, the absorption of polarized UV having a wavelength of 335 nm was measured with respect to the polysilane built-up film thus formed on the substrate by means of the LB technique. The absorption of the UV having a moment in the pulling direction of the substrate was found to be greater than that of the UV having a moment in the direction perpendicular to the pulling direction noted above. This indicates that Si-Si backbones of the polysilane P-12 forming the polysilane built-up film are oriented along the pulling direction of the substrate in the LB technique.

EXAMPLE 21

30 mg of polysilane P-13 shown was dissolved in one liter of cyclohexanone, and the resultant polymer solution was spread on the surface of water so as to form a monomolecular film. Further, a polysilane built-up film, in which of 20 layers of the monomolecular films of the polysilane P-13 were built up, was formed by the LB technique, as in Example 13.

The surface of the built-up film was observed with SEM. The built-up film was found to be free of defects and substantially uniform.

Further, the absorption of polarized UV having a wavelength of 345 nm was measured with respect to the polysilane built-up film thus formed on the substrate by means of the LB technique. The absorption of the UV having a moment in the pulling direction of the substrate was found to be substantially equal to that of the UV having a moment in the direction perpendicular to the pulling direction noted above. This indicates that the orientation of Si-Si backbones of the polysilane P-13 forming the polysilane built-up film are somewhat irregular in a two dimensional plane.

COMPARATIVE EXAMPLE 2

30 mg of polysilane PX-2 was dissolved in one liter of chloroform, and the resultant solution was dripped onto the surface of water. However, it was impossible to obtain a monomolecular film.

EXAMPLE 22

30 mg of the polysilane P-1 synthesized in Example 1 was dissolved in one liter of cyclohexanone, and the resultant polymer solution was spread on the surface of water so as to form a monomolecular film. Then, a silicon wafer substrate was dipped into water in a direction perpendicular to the water surface (or the surface of the monomolecular film), followed by pulling up the substrate (operation 1).

Likewise, 30 mg of phthalocyanine was dissolved in one liter of chloroform, and the resultant solution was spread on the surface of water so as to form a monomolecular film. Then, a silicon wafer substrate was dipped into water in a direction perpendicular to the water surface (or the surface of the monomolecular film), followed by pulling up the substrate (operation 2).

The operations 1 and 2 described above were alternately performed repeatedly so as to from an organic thin film element comprising 12 layers of the polysilane (P-1) monomolecular films and 12 layers of the organic thin films (phthalocyanine). In other words, the element has a multi-layer structure, in which each of the polysilane monomolecular films and each of the organic thin films were alternately laminated one upon the other.

EXAMPLE 23

30 mg of the polysilane P-2 synthesized in Example 2 was dissolved in one liter of cyclohexanone, and the resultant polymer solution was spread on the surface of water so as to form a monomolecular film. Further, an organic thin film element having a thickness of about 200 Å, and comprising a polysilane thin film and an organic thin film containing phthalocyanine, which were laminated one upon the other, was formed on a substrate as in Example 22 by using the polymer solution noted above and an organic material of phthalocyanie.

The surface of the organic thin film element thus formed was observed with SEM. The organic thin film element was found to be free of defects and substantially uniform.

Further, the sensitivity of the organic thin film element to light was measured, with the result that the element exhibited an electromotive force of 3.5 lux. sec.

EXAMPLE 24

30 mg of the polysilane P-3 synthesized in Example 3 was dissolved in one liter of cyclohexanone. Then, an organic thin film element comprising 50 polysilane monomolecular films and 50 organic thin films each containing $C_{60}$ (fluare molecule) was formed on a substrate as in Example 22 by using the polymer solution noted above and an organic material of $C_{60}$ noted above. In other words, the element comprised a multi-layer structure, in which each of the polysilane monomolecular films and each of the $C_{60}$ thin films were alternately laminated on upon the other.

The surface of the organic thin film element thus formed was observed with SEM. The organic thin film element was found to be free of defects and substantially uniform.

Further, the mobility of holes with respect of the organic thin film element was measured by the time-of-flight method, obtaining a value of $10-4 cm^2/V.sec$. This clearly indicates that the organic thin film element is adapted for use as a layer for migrating holes. Still further, the three dimensional non-linear susceptibility of the thin film element was measured, obtaining a result of $10^{-11}$ eau. In other words, the thin film element has been found to exhibit excellent non-linear optical characteristics.

EXAMPLE 25

An organic thin film element comprising 20 polysilane monomolecular films and 20 organic thin films each containing TCNQ (7,7,8,8-tetracyano quinone dimethane) was formed on a substrate as in Example 22 by using a solution prepared by dissolving 30 mg of the polysilane P-2 in one liter of cyclohexanone and another organic material of TCNQ. In other words, the element comprised a multi-layer structure, in which each of the polysilane monomolecular films and each of the TCNQ thin films were alternately laminated one upon the other.

The surface of the organic thin film element thus formed was observed with SEM. The organic thin film element was found to be free of defects and substantially uniform.

Further, the electrical conductivity of the organic thin film element was measured, obtaining a result of $10^{-4} \Omega cm$. In other words, the organic thin film element was found to have a high electrical conductivity.

EXAMPLE 26

An organic thin film element comprising 20 polysilane monomolecular films and 20 organic thin films each containing another organic material of the compound (K-1), which were laminated one upon the other, was formed on a substrate as in Example 22 by using a solution prepared by dissolving 30 mg of the polysilane P-2 in one liter of cyclohexanone and another organic material of the compound K-1. In other words, the element comprised a multi-layer structure, in which each of the polysilane monomolecular films and each of the organic thin films were alternately laminated one upon the other.

The surface of the organic thin film element thus formed was observed with SEM. The organic thin film element was found to be free of defects and substantially uniform.

Further, the mobility of holes with respect to the organic thin film element was measured by the time-of-flight method, obtaining a value of $10^{-4} cm^2/V.sec$. This clearly indicates that the organic thin film element is adapted for use as a layer for migrating holes.

EXAMPLE 27

An organic thin film element comprising 20 polysilane monomolecular films and 20 organic thin films each containing another organic material of phthalocyanine, which were laminated one upon the other, was formed on a substrate as in Example 22 by using a solution prepared by dissolving 30 mg of the polysilane P-4 synthesized in Example 22 in one liter of cyclohexanone and another organic material of phthalocyanine. In other words, the element comprised a multi-layer structure, in which each of the polysilane monomolecular films and each of the phthalocyanine thin films were alternately laminated one upon the other.

The surface of the organic thin film element thus formed was observed with SEM. The organic thin film element was found to be free of defects and substantially uniform. Further, the three dimensional nonlinear susceptibility of the organic thin film element was measured, obtaining a value of $10^{-11}$ esu in the pulling direction of the substrate in the LB technique and a value of $10^{-13}$ esu in the direction perpendicular to the pulling direction. In other words, the organic thin film element was found to exhibit an anisotropy.

The Examples given below are directed to cases where a film of an organic polysilane having a Si-Si backbone including the polysilane monomolecular film and built-up film of the present invention is used in a liquid crystal display device. In the Examples and Comparative Examples given below, the liquid crystal display element was manufactured and evaluated in the form of a liquid crystal cell.

EXAMPLE 28

Hard glass NA-45 (trade name of hard glass manufactured by K. K. Hoya) having ITO (Indium Tin Oxide) film formed thereon by means of vapor deposition was cut into wafers, followed by treating the wafer with a mixture of an aqueous hydrogen peroxide and sulfuric acid. Then, the wafer was washed with water and dried by a rinser dryer. The wafer was further dried at 150° C. for 30 minutes so as to form a glass substrate.

In the next step, a TFT (thin film transistor) was mounted to the glass substrate, followed by spin-coating the surfaces of the TFT and ITO film formed on the glass substrate with a 15% xylene solution of phenyl hexyl polysilane (PX-3) having a molecular weight of 150,000. The coating was then dried at 150° C. for 30 minutes so as to form a polysilane thin film, followed by applying a rubbing treatment to the polysilane thin film by the ordinary method.

On the other hand, a polysilane thin film was similarly formed on the surface of a color filter (substrate) overcoated with a protective film, followed by applying a rubbing treatment to the polysilane film.

Each of these substrates having the polysilane thin films, to which the rubbing treatment was applied, formed thereon was cut into small pieces each sized 2 cm square. A pair of the two kinds of the substrates (cut pieces) were arranged to face each other such that the rubbing direction of the polysilane film on one of these substrates is perpendicular to that of the polysilane film on the other substrate. Then, a liquid crystal cell was manufactured by the ordinary method. In manufacturing the liquid crystal cell, a two-liquid epoxy resin which can be cured at room temperature was used as a sealant. Also, a glass fiber having a diameter of 6 μm was used as a spacer. Further, a nematic liquid crystal composition ZLI-1370 manufactured by Merk Inc. was sealed in the cell.

The liquid crystal cell thus manufactured was subjected to evaluation with respect to the relationship between the voltage and the amount of the transmitting light, i.e., V-T characteristics. A change in the threshold voltage was not recognized, and the liquid crystal cell was found to operate satisfactorily.

COMPARATIVE EXAMPLE 3

A liquid crystal cell was manufactured substantially as in Example 28, except that the substrate was spin-coated with PIX1400 (trade name of a thermosetting polyimide manufactured by Hitachi Chemical Co., Ltd.) in place of the polysilane used in Example 28. The liquid crystal cell thus manufactured was also subjected to evaluation of the V-T characteristics. The threshold voltage was found to be changed by about 0.2 V.

EXAMPLE 29

30 mg of polysilane P-4 was dissolved in one liter of cyclohexanone, followed by spreading the resultant solution on the surface of water so as to form a monomolecular film. Then, each of the glass substrate and the color filter substrate used in Example 28 was dipped in the water in a direction perpendicular to the water surface (or the surface of the monomolecular film), followed by pulling the substrate from the water. This operation was repeatedly carried out 20 times so as to form a polysilane built-up film by the LB technique on the substrate, said built-up film comprising 20 monomolecular films of the polysilane P-4.

Each of these substrates having the polysilane built-up films formed thereon was cut into small pieces of a predetermined size. A pair of the two kinds of the substrates (cut pieces) were arranged to face each other such that the substrates were aligned in the pulling direction from the water surface in the LB technique. Then, a liquid crystal cell having a nematic liquid crystal composition ZLI-1370 manufactured by Merk Inc. sealed therein was manufactured by the ordinary method, as in Example 28.

The liquid crystal cell thus manufactured was held between two polarizing plates, and the direction of the polarizing plate was changed so as to observe the state of orientation of the liquid crystal molecules. It has been found that the light passes through the device in the case where the direction of the polarizing plate was equal to the pulling direction of the substrate in the LB technique. On the other hand, the light transmission was not recognized at all in the case where the direction of the polarizing plate was perpendicular to the pulling direction of the substrate in the LB technique. This suggests that molecules of the polysilane P-4, that is, the Si-Si backbones on the substrate were oriented along the direction of pulling up the substrate in the LB technique, and that the polysilane built-up film permits the liquid crystal molecules to be oriented along the direction of orientation of the polysilane molecules.

The liquid crystal cell thus manufactured was subjected to evaluation of the V-T characteristics. The threshold voltage was found to be constant, and the liquid crystal cell was found not to be affected by the charge up generation so as to operate satisfactorily.

COMPARATIVE EXAMPLE 4

30 mg of polysilane P-4 was dissolved in one liter of cyclohexanone. Then, each of the glass substrate and the color filter substrate used in Example 28 was spin-coated with the resultant solution so as to form a polysilane thin film. Other treatments were not applied for forming the polysilane thin film.

Each of these substrates having the polysilane thin films formed thereon was cut into small pieces of a predetermined size. A pair of the two kinds of the substrates (cut pieces) were arranged to face each other, and a liquid crystal cell having a nematic liquid crystal composition ZLI-1370 manufactured by Merk Inc. sealed therein was manufactured by the ordinary method, as in Example 28.

The liquid crystal cell thus manufactured was held between two polarizing plates, and the direction of the polarizing plate was changed so as to observe the state of orientation of the liquid crystal molecules. It has been found that it was impossible to suppress completely the light transmission depending on the direction of the polarizing plate. This indicates that the thin film of polysilane having a repeating unit (1) is incapable of controlling the orientation of the liquid crystal molecules unless the polysilane thin film is in the form of a monomolecular film or built-up film. In other words, it is necessary to apply an orientation treatment to the polysilane thin film in order to enable the thin film to orientate the liquid crystal molecules.

EXAMPLES 30 TO 33

Liquid crystal cells were manufactured as in Example 28, except that the organic polysilanes of P-14, P-15, P-16 and P-17 were used in these Examples 30 to 33, respectively. The liquid crystal cells thus manufactured was subjected to evaluation of the V-T characteristics. The threshold voltage was found to be constant, and the liquid crystal cell was found not to be affected by the charge up generation so as to operate satisfactorily.

EXAMPLE 34

Hard glass NA-45 (trade name of hard glass manufactured by K. K. Hoya) having ITO film formed thereon by means of vapor deposition was cut into wafers, followed by treating the wafer with a mixture of an aqueous hydrogen peroxide and sulfuric acid. Then, the wafer was washed with water and dried by a rinser dryer. The wafer was further dried at 150° C. for 30 minutes so as to form a glass substrate.

In the next step, a TFT (thin film transistor) was mounted to the glass substrate, followed by spin-coating the surfaces of the TFT and ITO film formed on the glass substrate with a 15% cyclohexane solution of polysilane (P-18) having a molecular weight of 200,000. The coating was then dried at 100° C. for 10 minutes so as to form a polysilane thin film, followed by exposing the polysilane thin film to light emitted from a mercury lamp, the light having a wavelength range of 370 nm or less being excluded, so as to crosslink the acrylic groups contained in the polysilane molecules. After the light exposure, a rubbing treatment was applied to the polysilane thin film by the ordinary method.

On the other hand, a polysilane thin film was similarly formed on the surface of a color filter (substrate) overcoated with a protective film, followed by applying the light exposure and, then, the rubbing treatment to the polysilane film as described above.

A liquid crystal cell was manufactured as in Example 28 by using these substrates each having the polysilane thin films, to which the rubbing treatment was applied, formed thereon.

The liquid crystal cell thus manufactured was subjected to evaluation of the V-T characteristics. A change in the threshold voltage was not recognized, and the liquid crystal cell was found not to be affected by the charge up generation and to operate satisfactorily. Further, since the polysilane thin film formed on the substrate was cured by the light exposure, the polysilane thin film acting as an orientating film of the liquid crystal cell was found to exhibit an improved mechanical strength.

EXAMPLE 35

30 mg of polysilane P-19 was dissolved in one liter of cyclohexanone, followed by spreading the resultant solution on the surface of water so as to form a monomolecular film. Then, each of the glass substrate and the color filter substrate used in Example 28 was dipped in the water in a direction perpendicular to the water surface (or the surface of the monomolecular film), followed by pulling the substrate from the water. This operation was repeatedly carried out 20 times so as to form a polysilane built-up film by the LB technique on the substrate, said built-up film comprising 20 monomolecular films of the polysilane P-19. Then, the polysilane built-up film was exposed to light emitted from a mercury lamp, the light having a wavelength range of 370 nm or less being excluded, so as to crosslink the acrylic groups contained in the polysilane molecules.

Each of these substrates having the polysilane built-up films formed thereon was cut into small pieces of a predetermined size. A pair of the two kinds of the substrates (cut pieces) were arranged to face each other such that the substrates were aligned in the pulling direction from the water surface in the LB technique. Then, a liquid crystal composition ZLI-1370 manufactured by Merk Inc. was sealed therein so as to manufacture a liquid crystal cell as in Example 28.

The liquid crystal cell thus manufactured was subjected to evaluation with respect to the relationship between the voltage and the amount of the transmitting light, i.e., the V-T characteristics. The threshold voltage was found to be constant, and the liquid crystal cell was found not to be affected by the charge up generation so as to operate satisfactorily. Further, since the polysilane thin film formed on the substrate was cured by the light exposure, the polysilane thin film acting as an orientating film of the liquid crystal cell was found to exhibit an improved mechanical strength.

As described above in detail, the polysilane monomolecular film and built-up film of the present invention exhibit excellent regularity and uniformity, leading to various excellent characterists described above. It follows that the polysilane monomolecular film and built-up film of the present invention can be used as functional materials in various fields. For example, the polysilane monomolecular film and built-up film of the present invention can be used as a layer for migrating holes and electric charges, a light-sensitive material used in a photolithography, an EL element, an optical delay element, a semiconductive material used in an organic thin film element such as a sensor, a non-linear optical material, an insulating material, a piezoelectric material and a pyroelectric material. Of course, the polysilane monomolecular film or built-up film of the present invention is of very high industrial value.

TABLE A

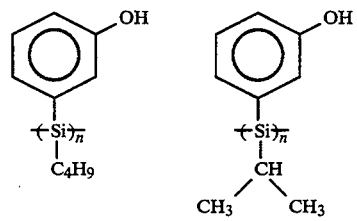

TABLE A-continued
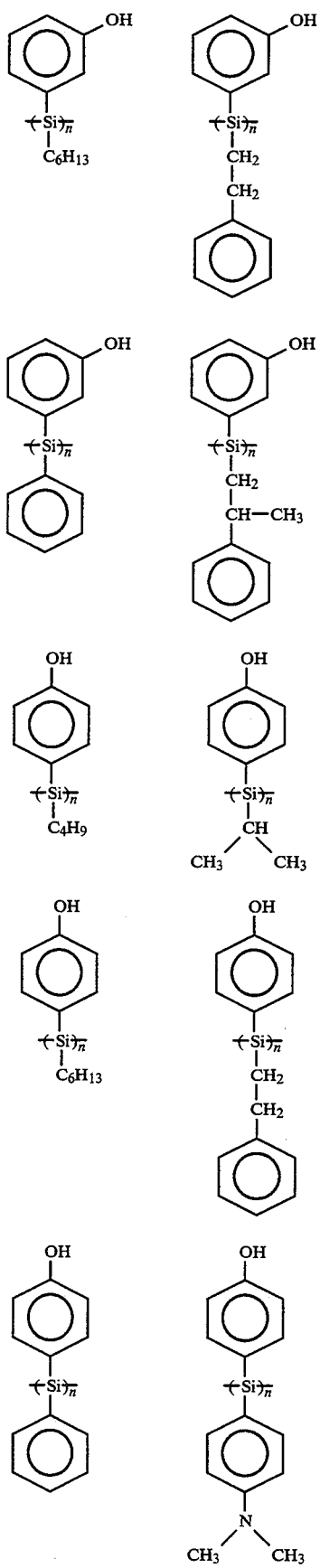
TABLE A-continued
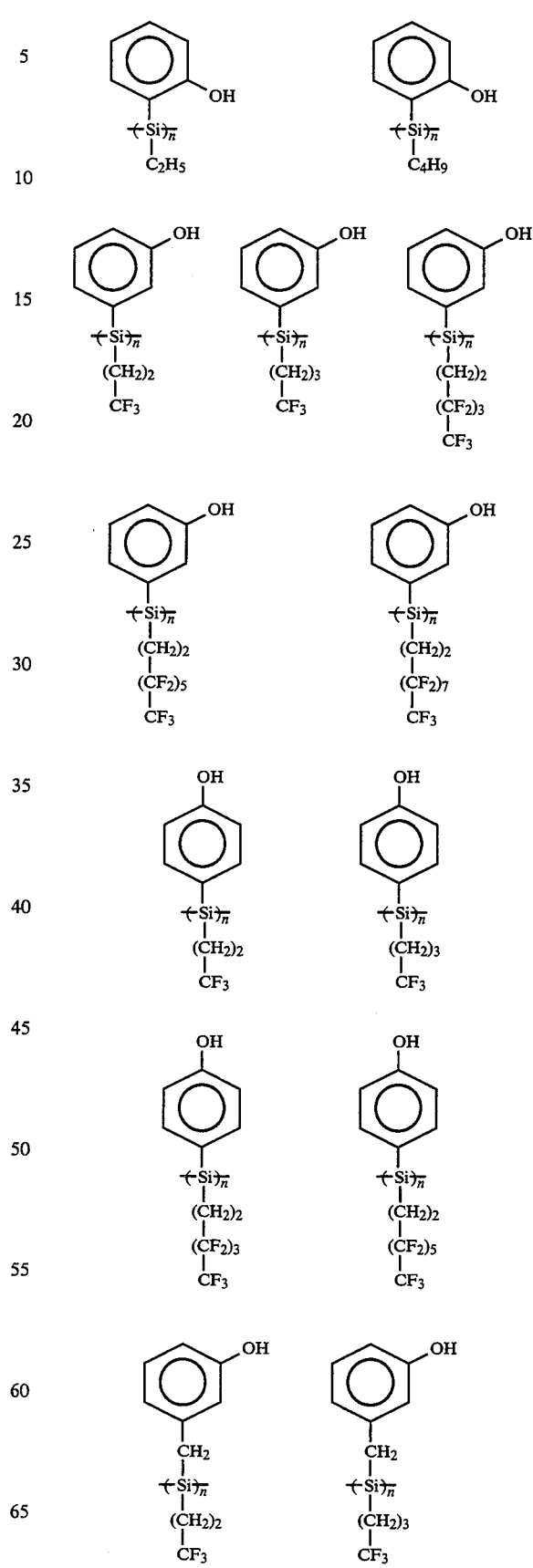

TABLE A-continued
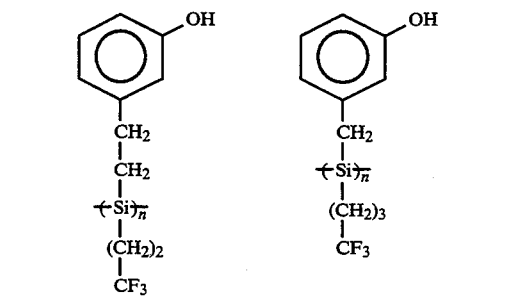
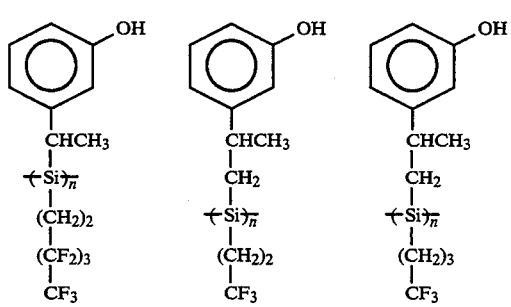
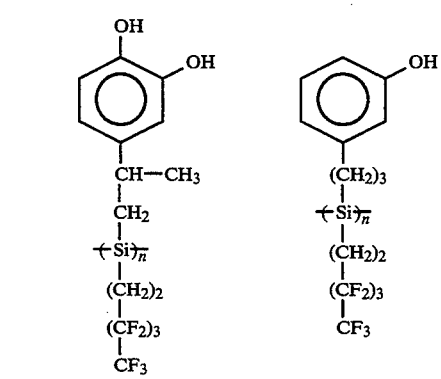
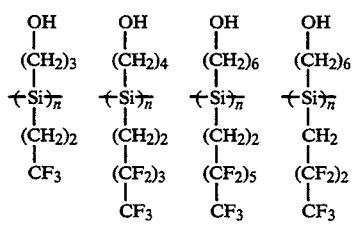
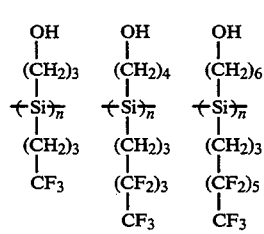
TABLE A-continued
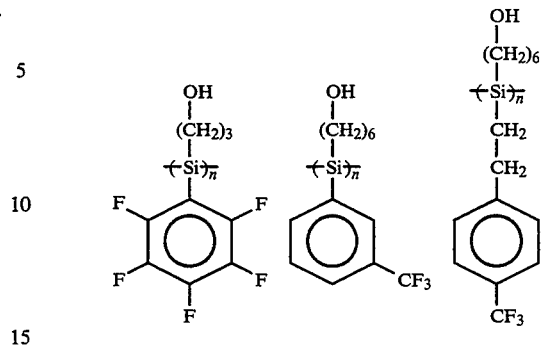
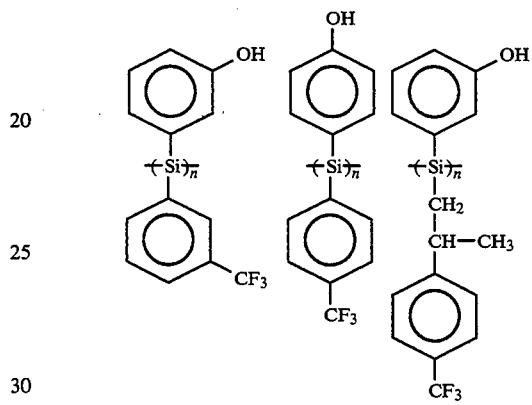
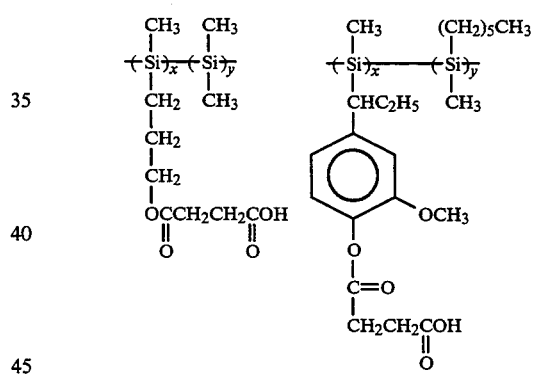
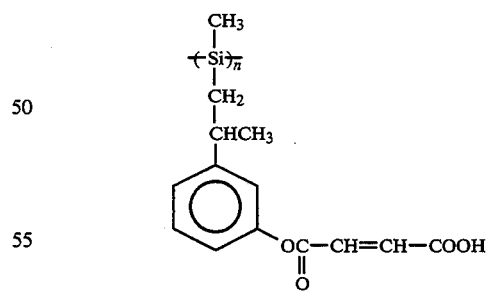
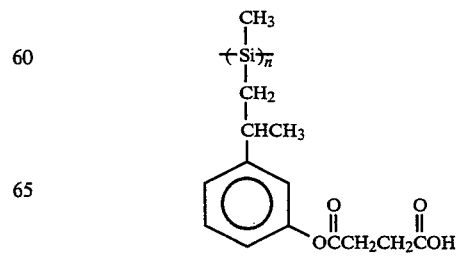

TABLE A-continued
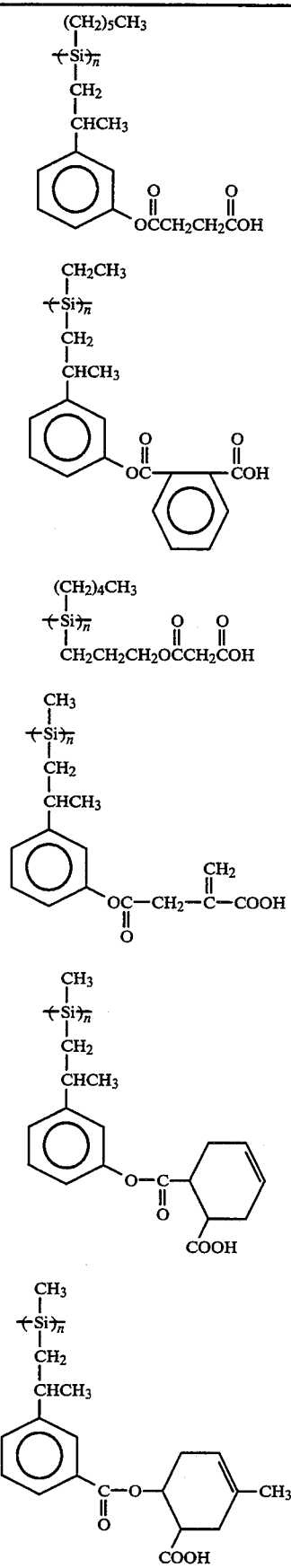
TABLE A-continued
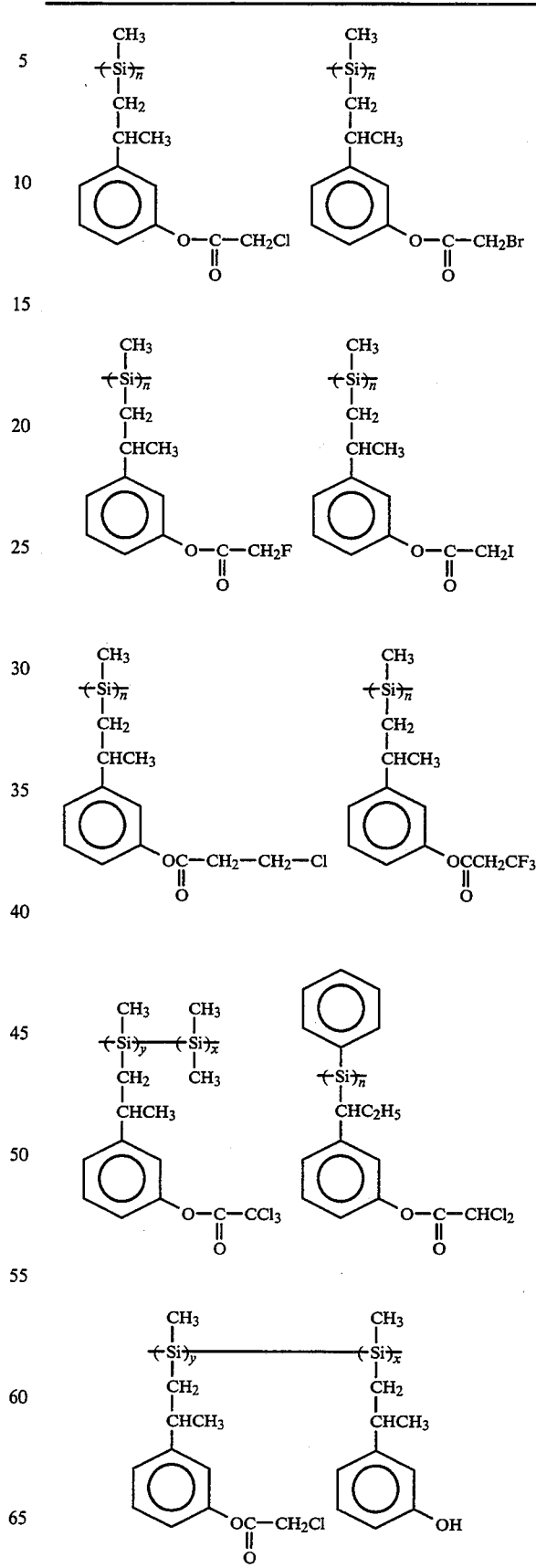

TABLE A-continued
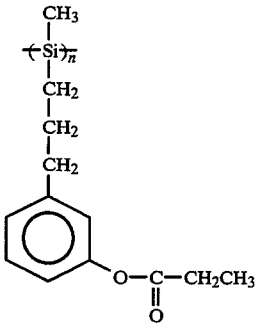
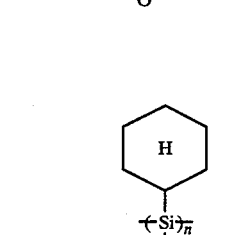
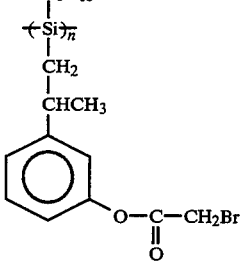
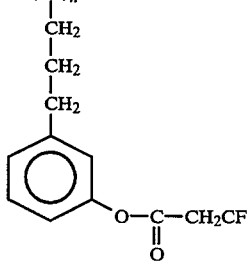
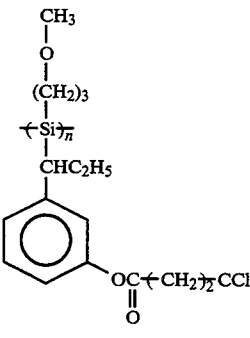
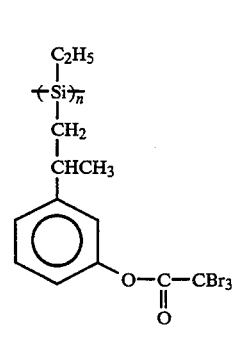
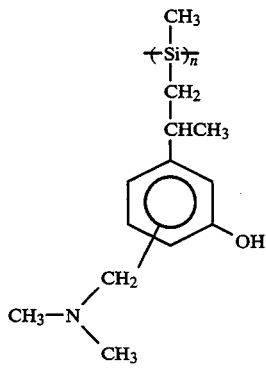
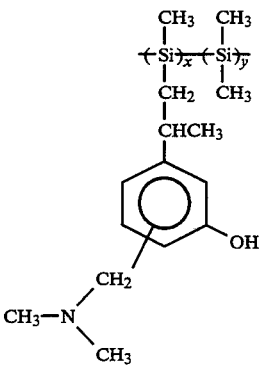
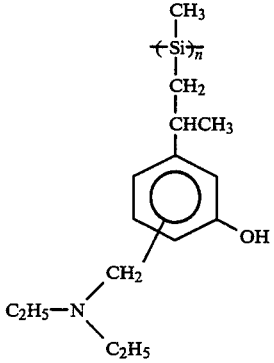
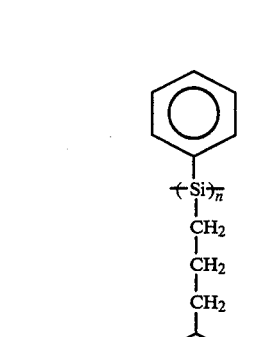
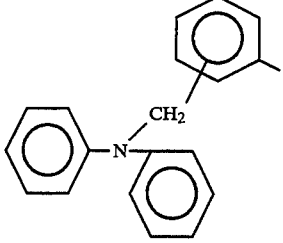
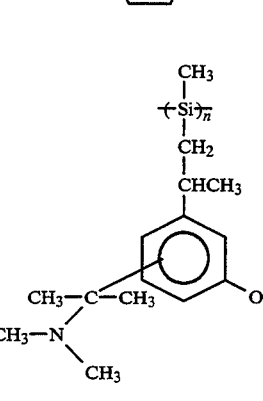
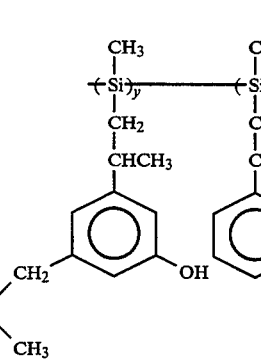
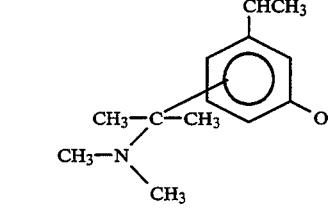
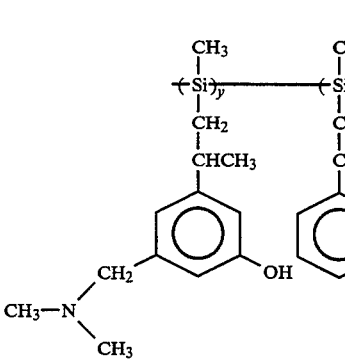

TABLE A-continued
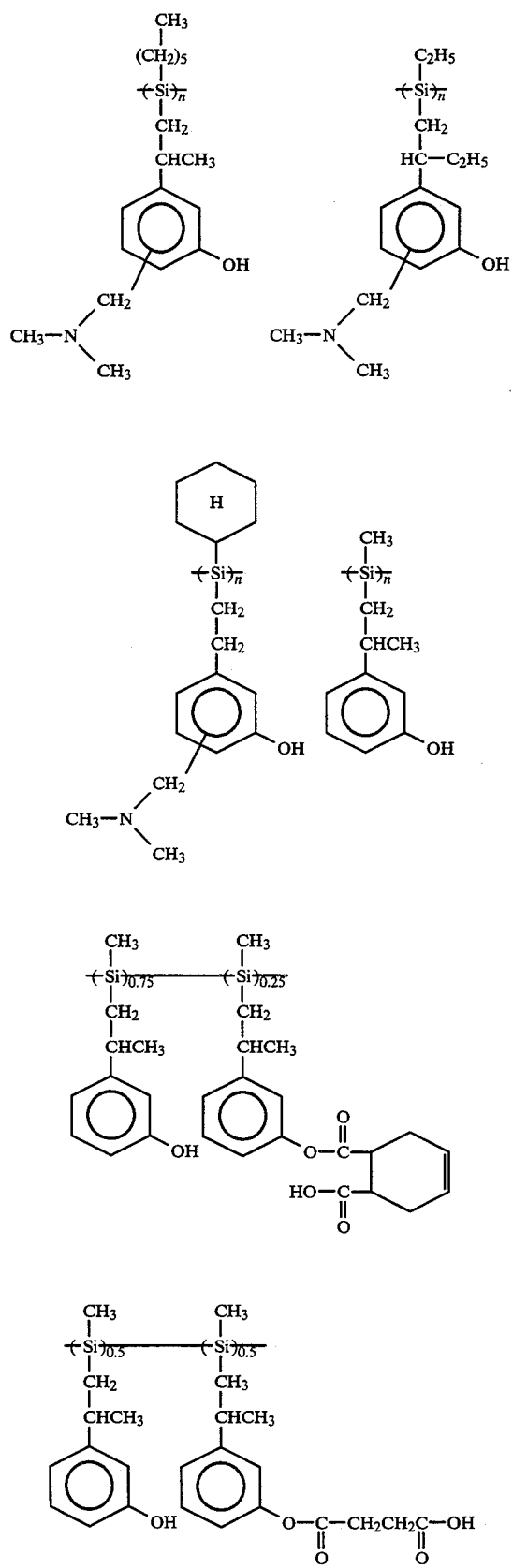
TABLE A-continued
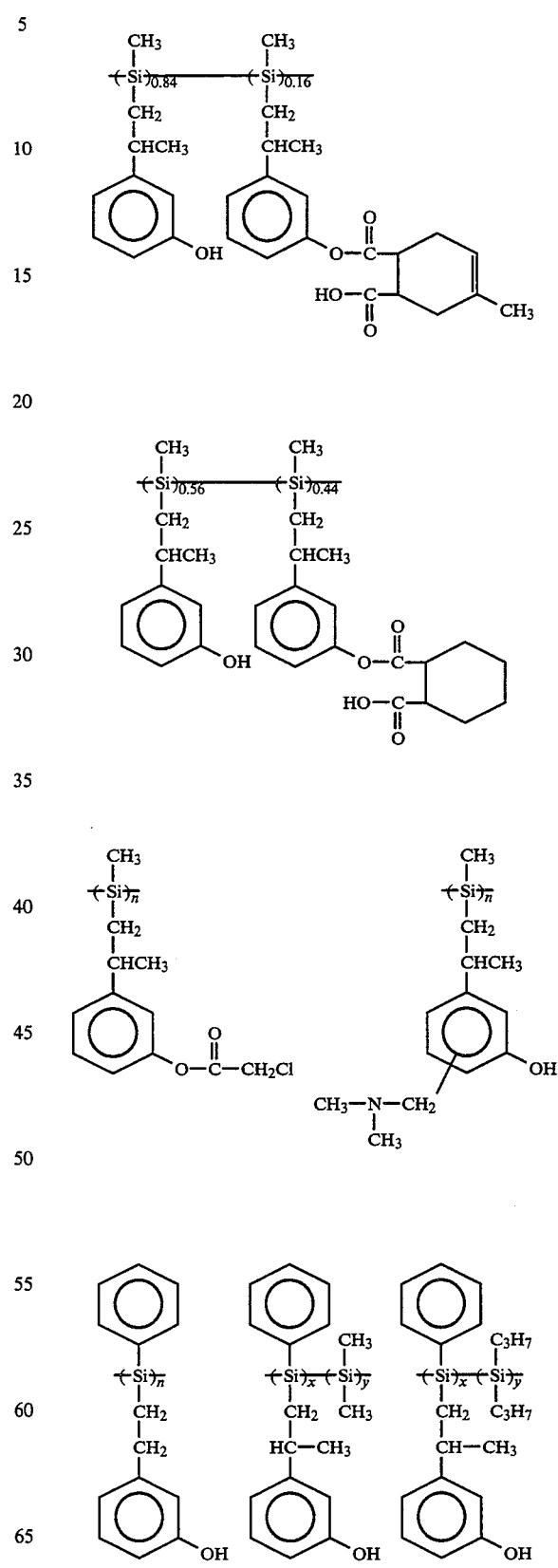

TABLE A-continued
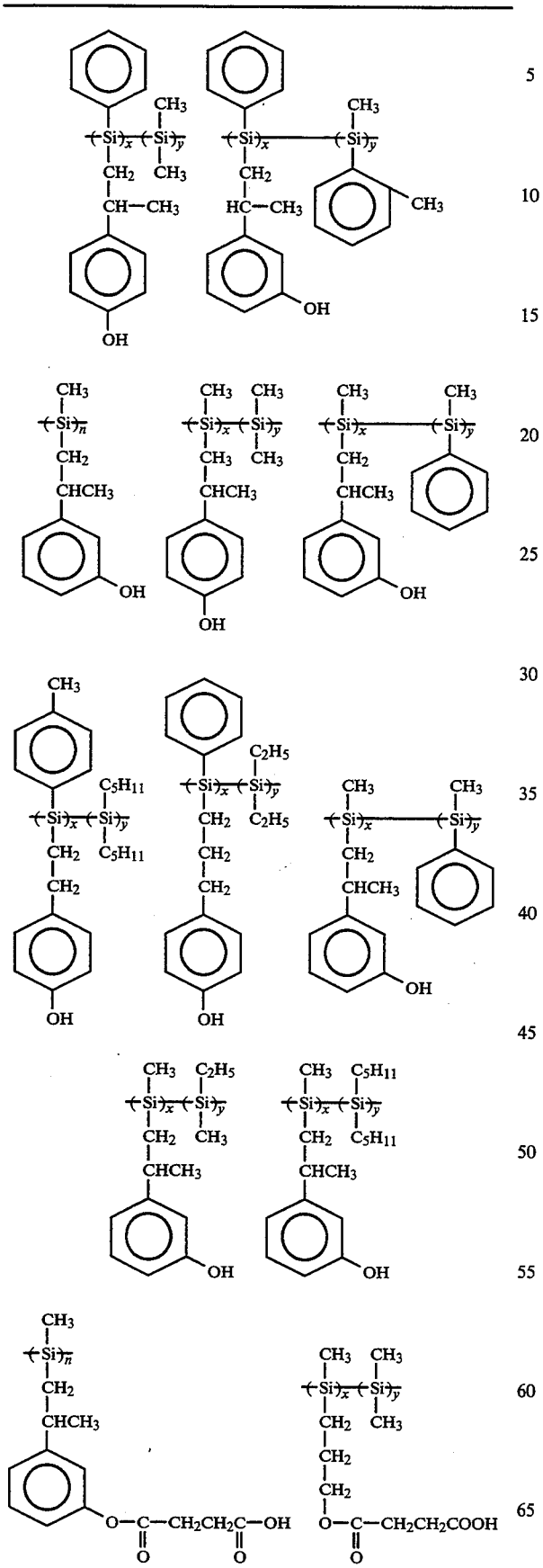
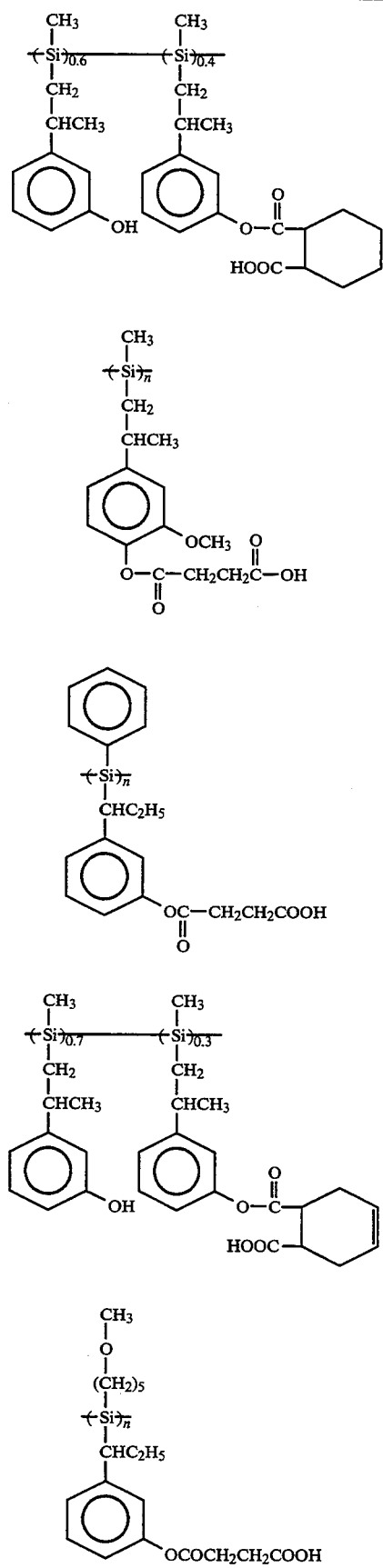

TABLE A-continued
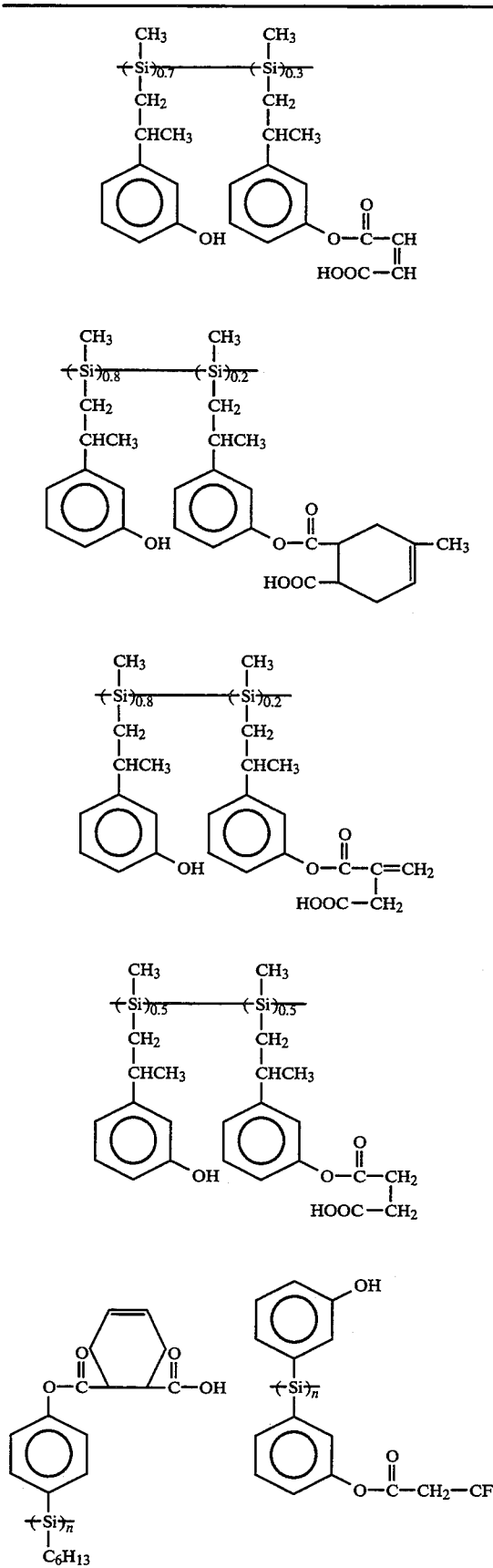
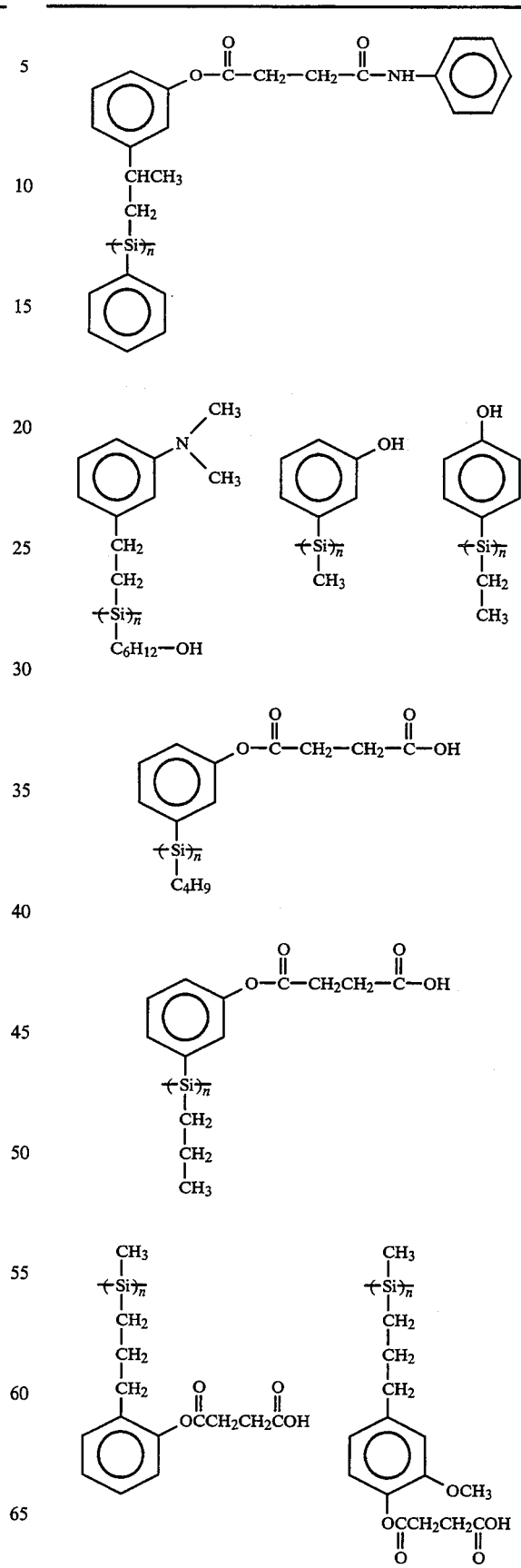

TABLE A-continued
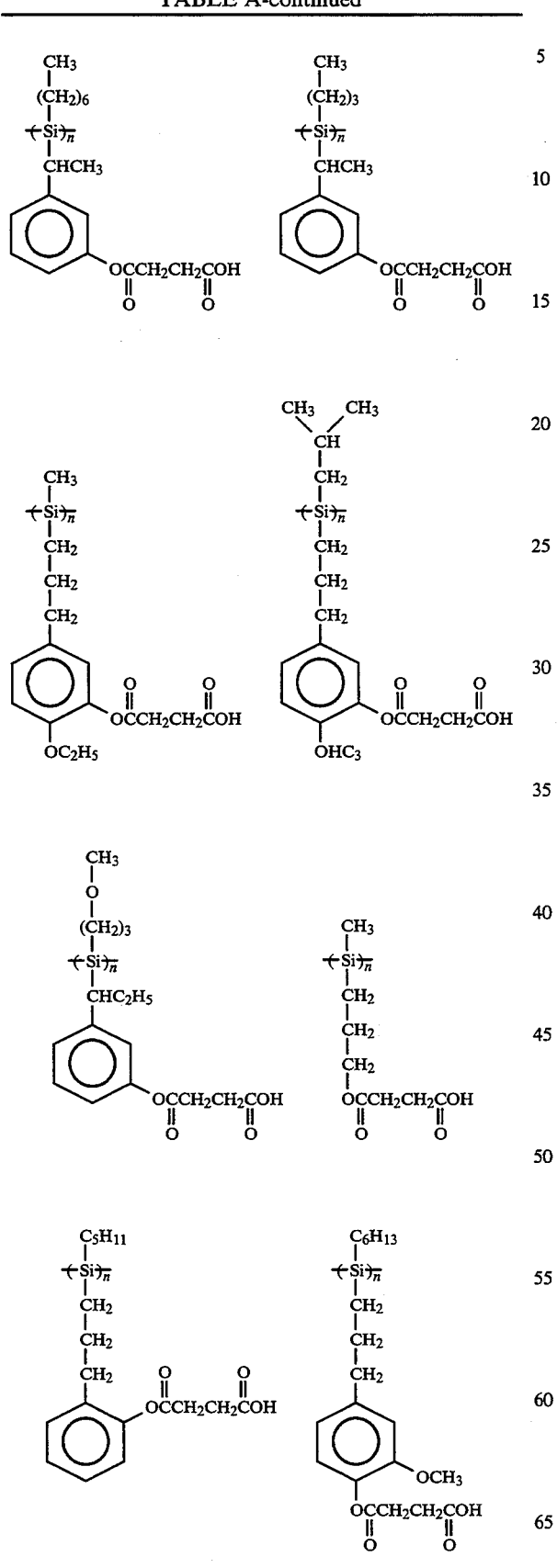
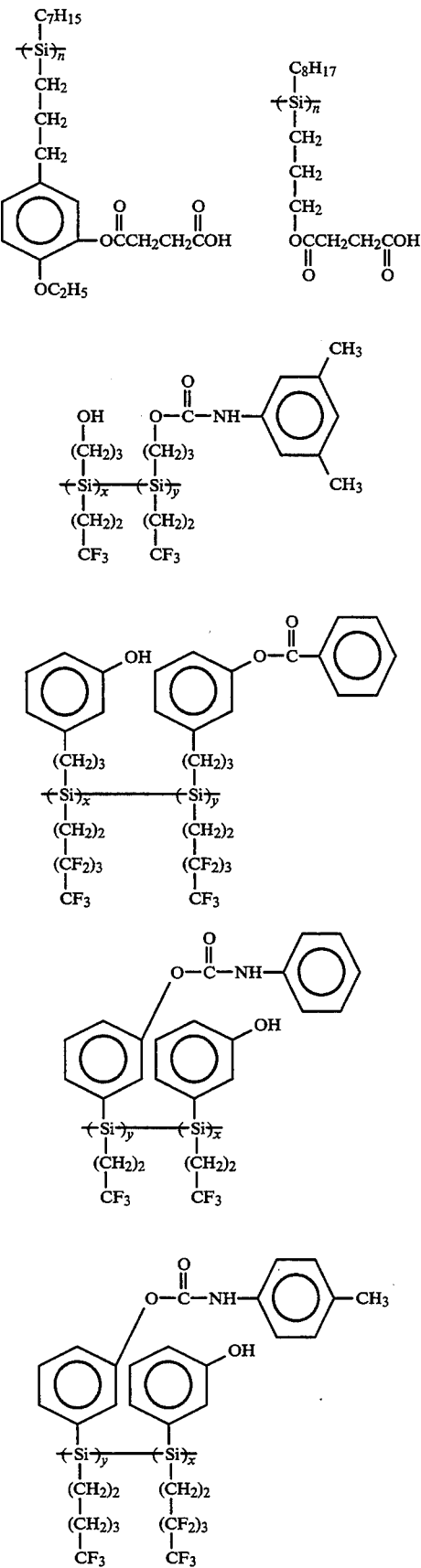

TABLE A-continued
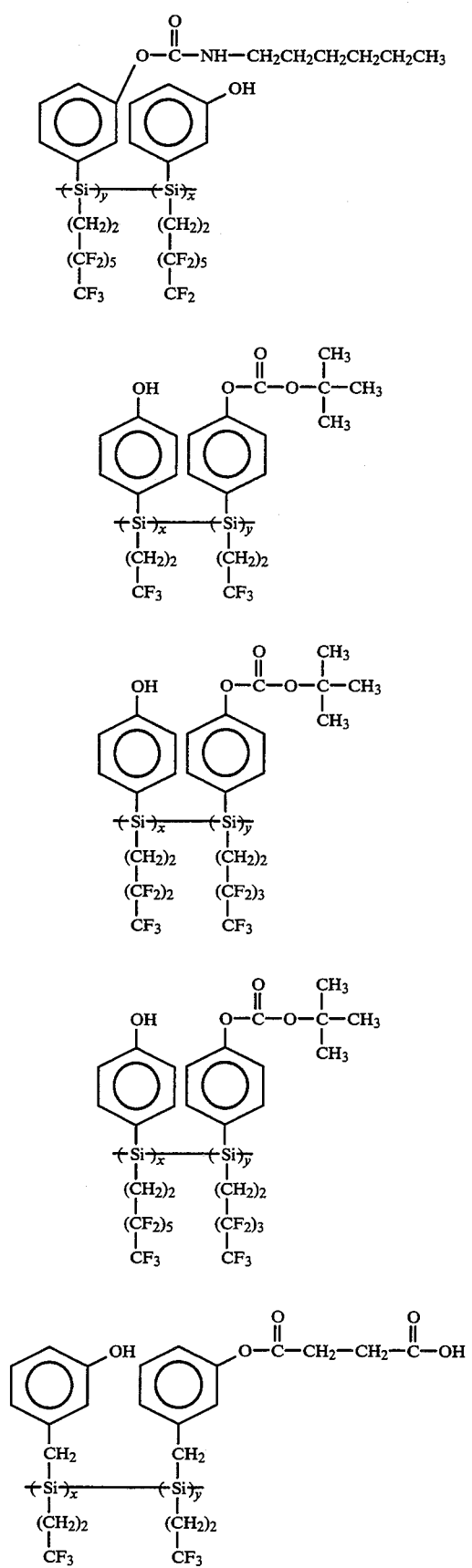
TABLE A-continued
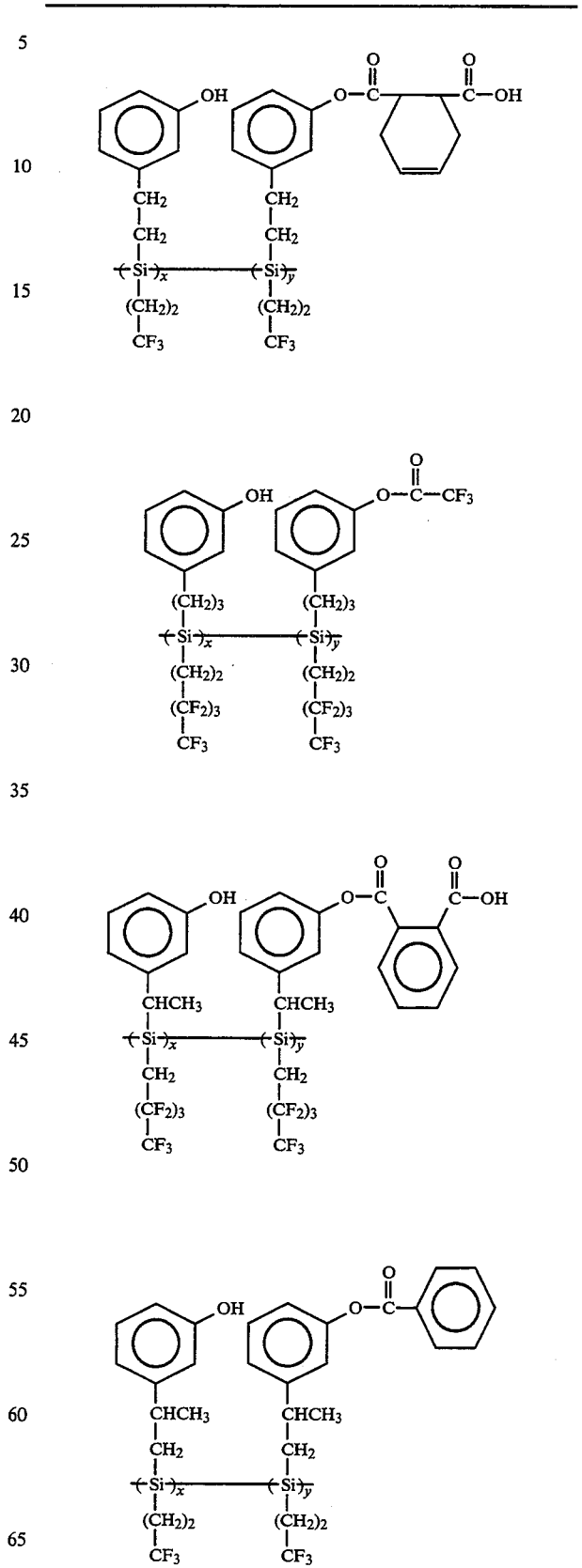

TABLE A-continued
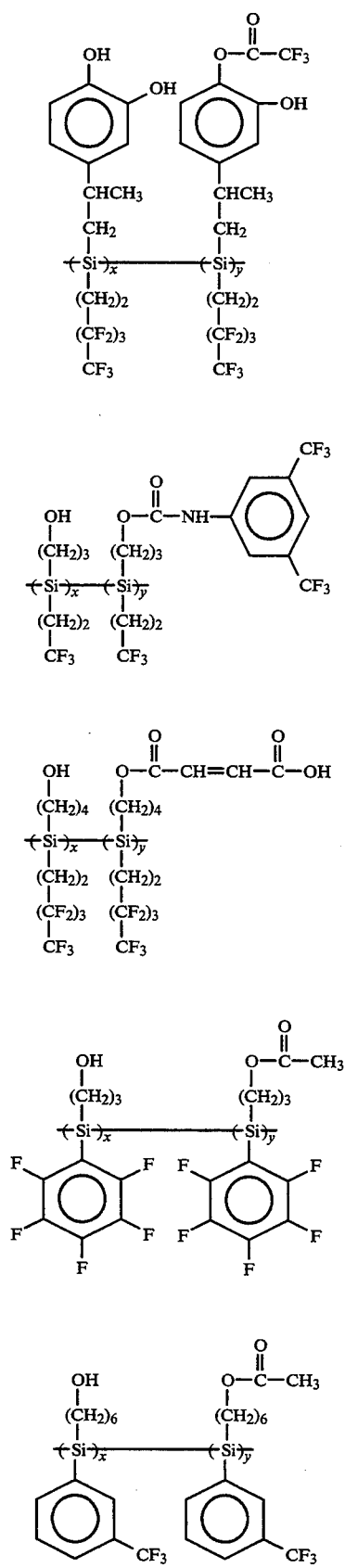
TABLE A-continued
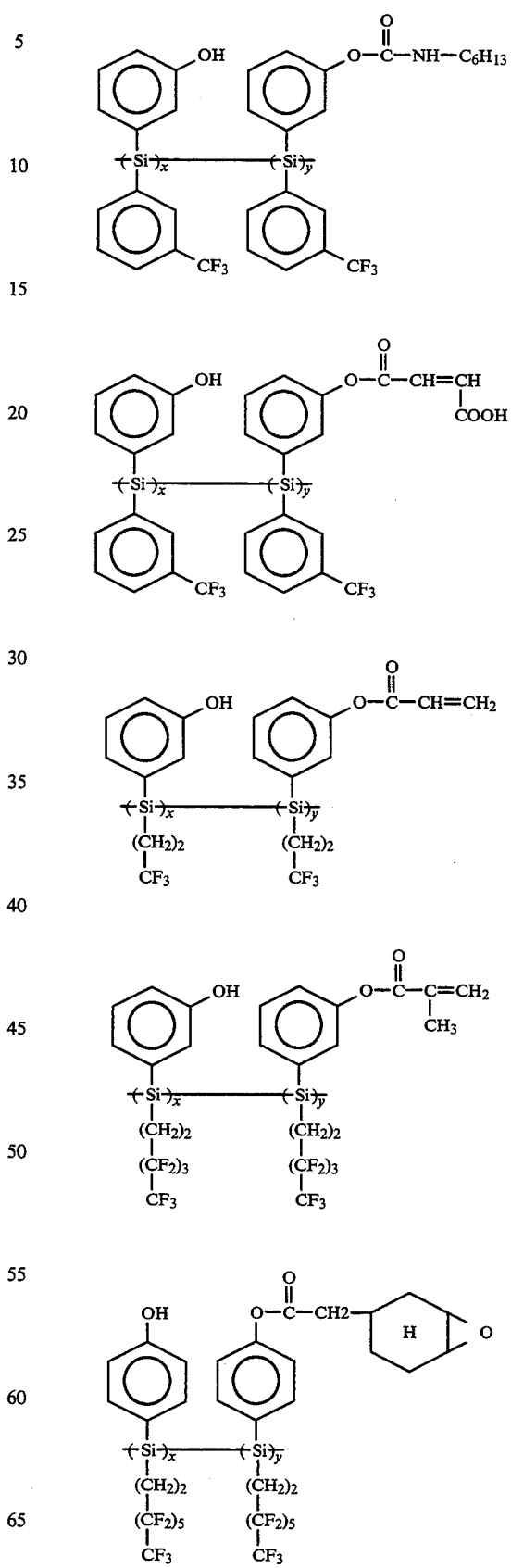

TABLE A-continued
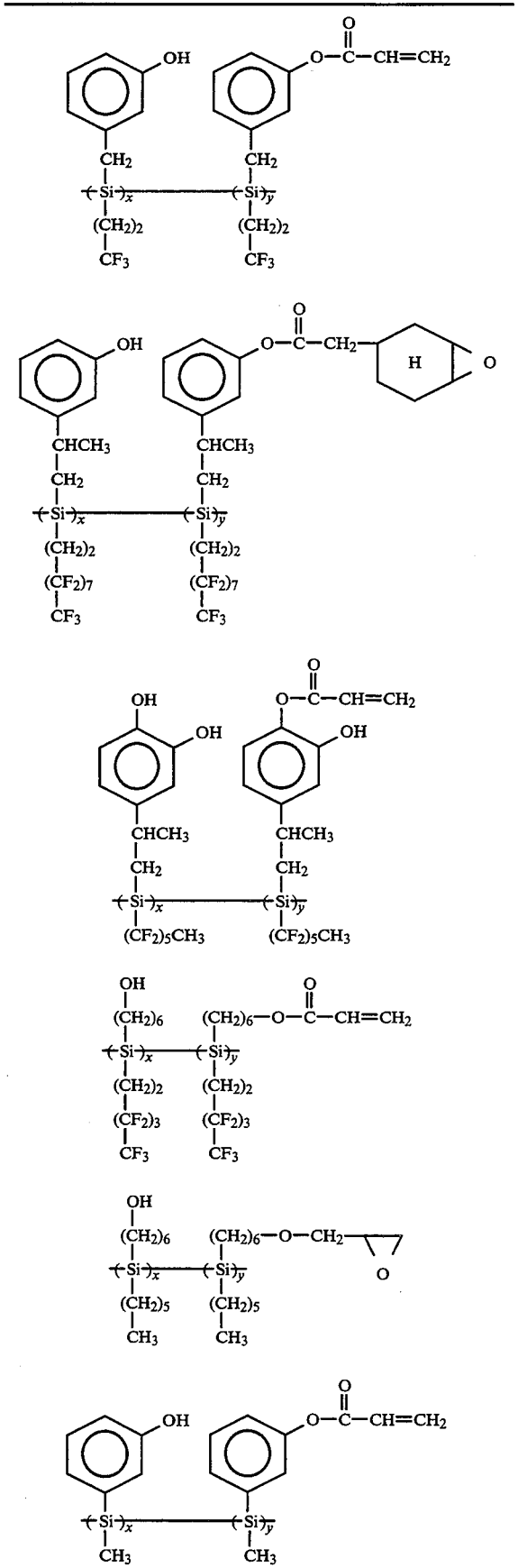

TABLE A-continued
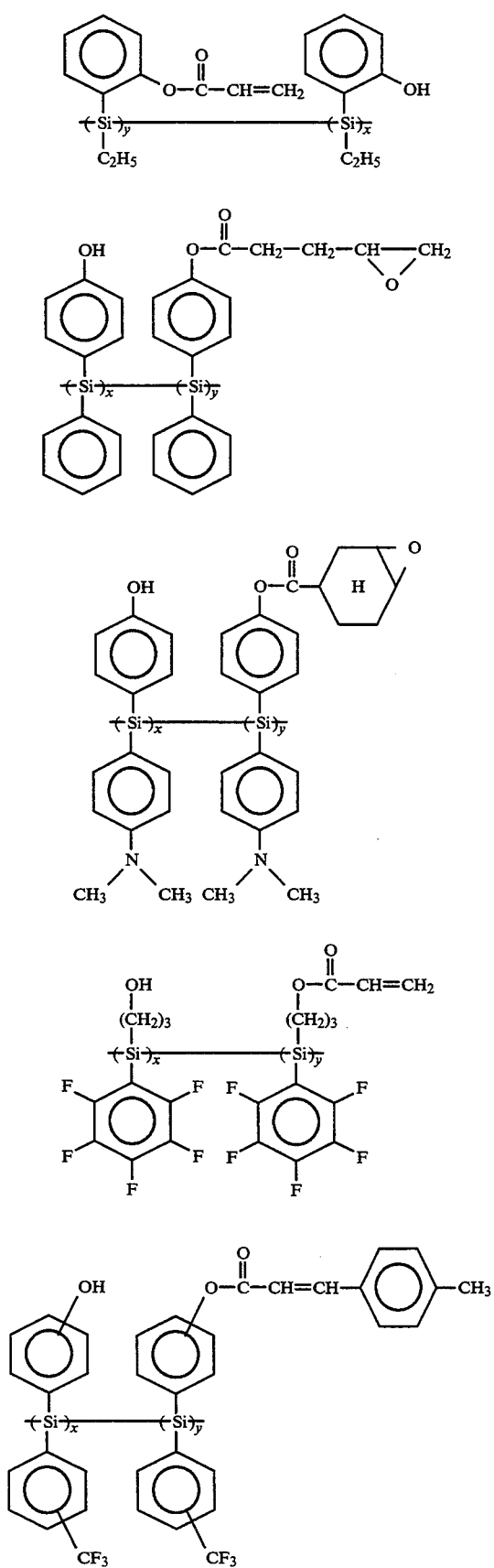
TABLE A-continued
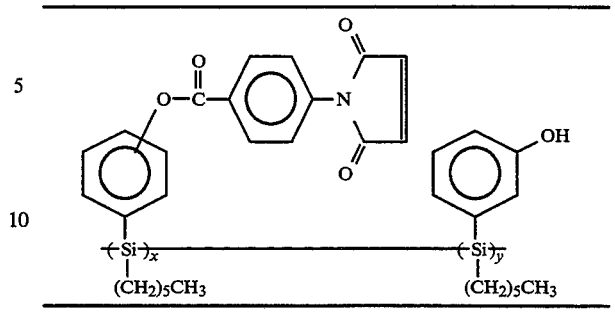
where n represents a degree of polymerization; and x and y represent copolymer composition.
TABLE B
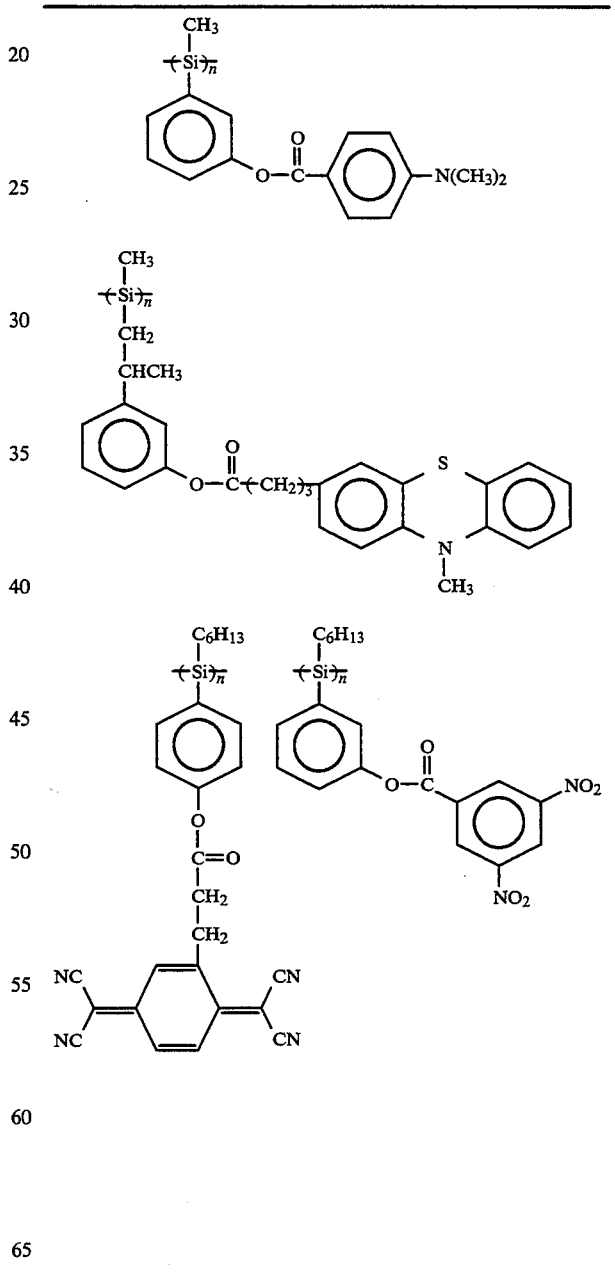

TABLE B-continued
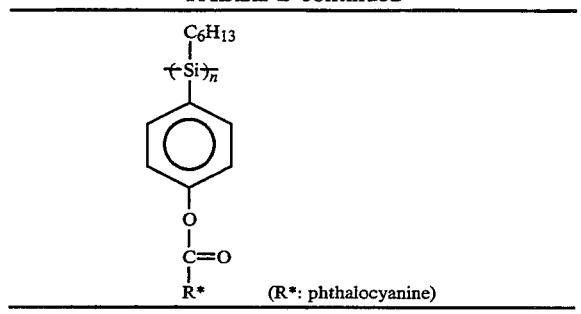
, where n represents a degree of polymerization.
TABLE C
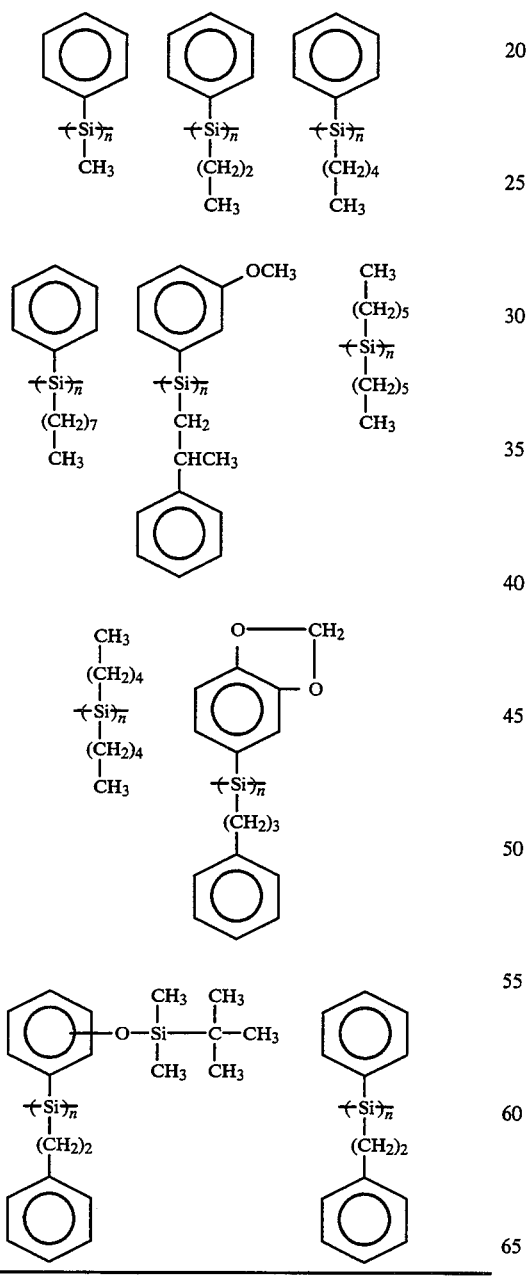
, where n represents a degree of polymerization.
TABLE D
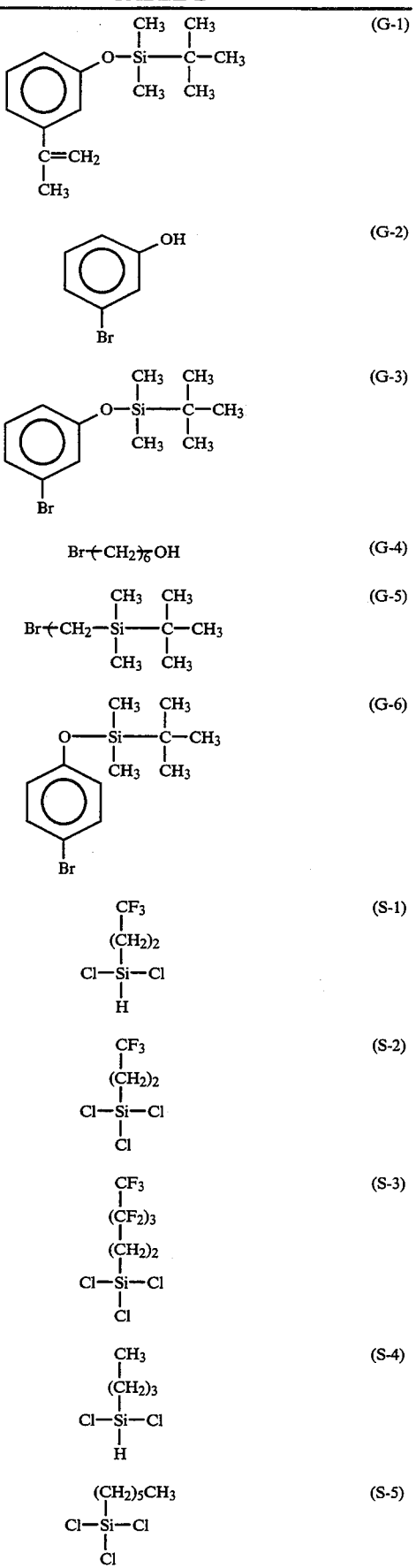

TABLE D-continued
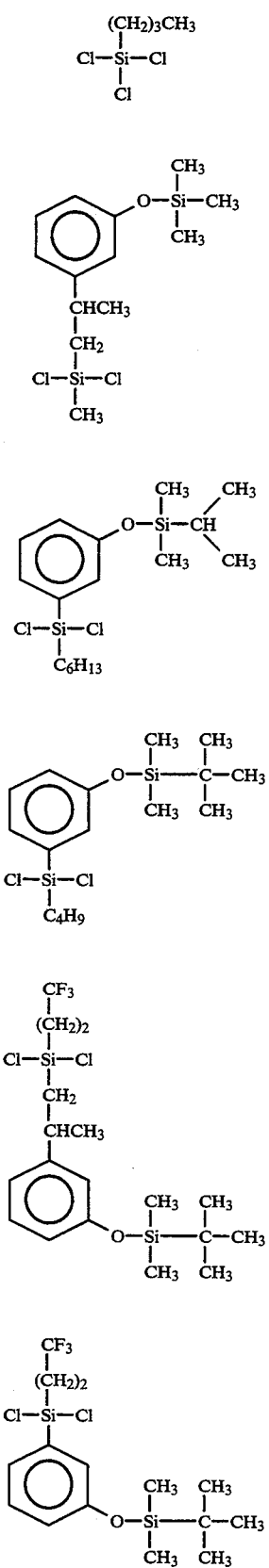
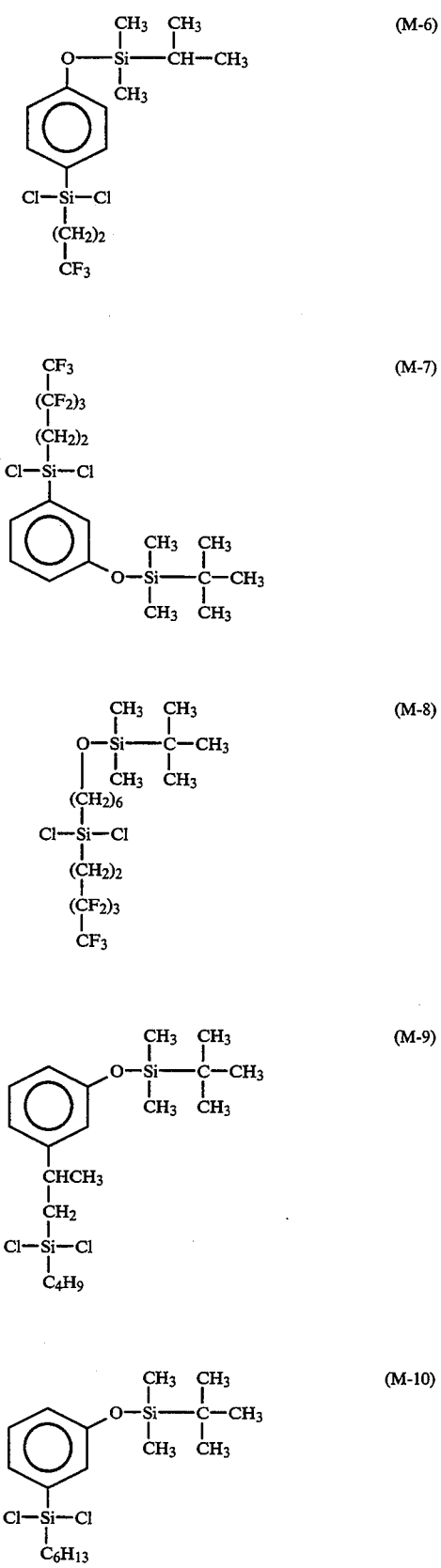

TABLE D-continued
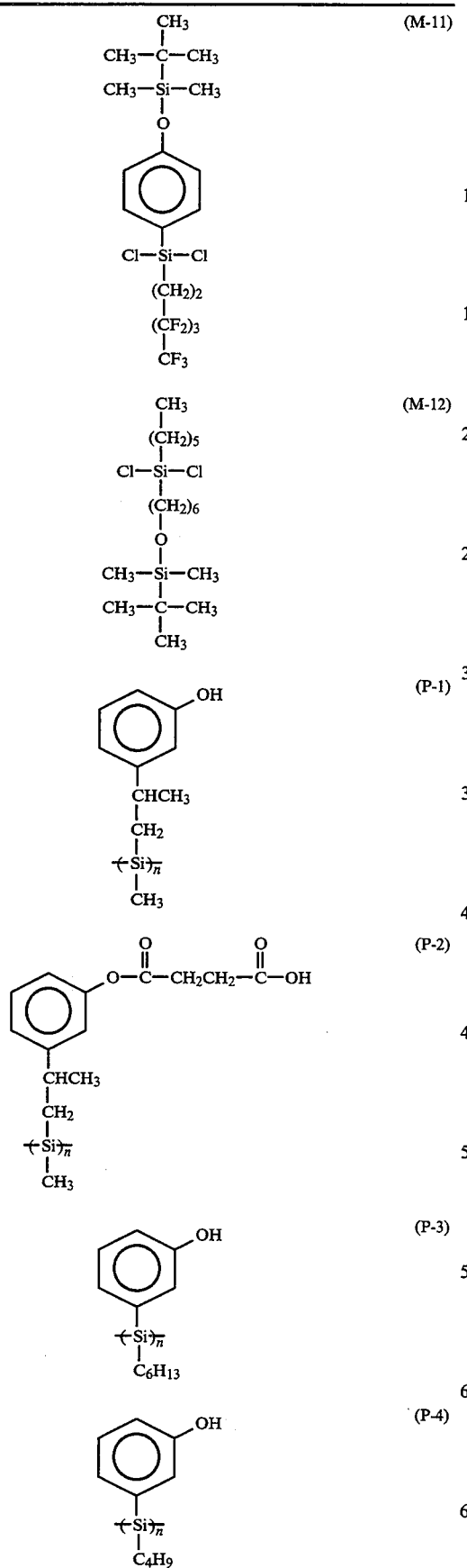
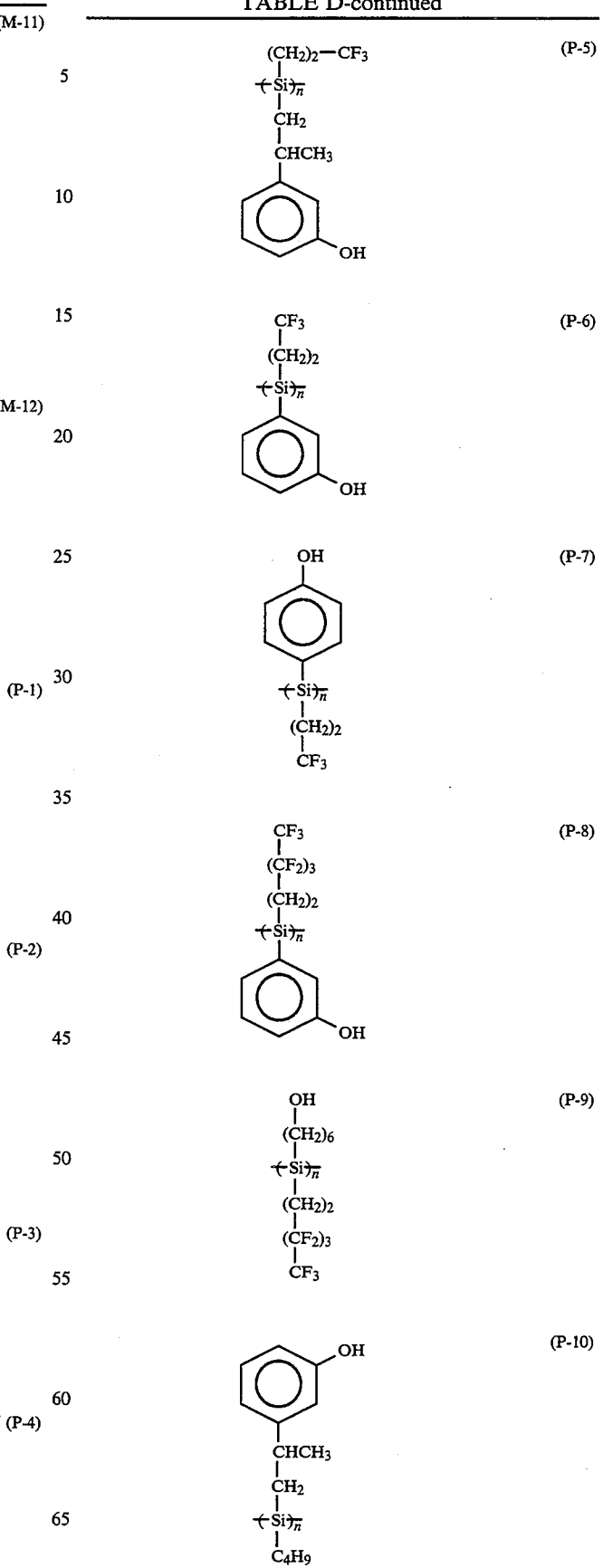

TABLE D-continued
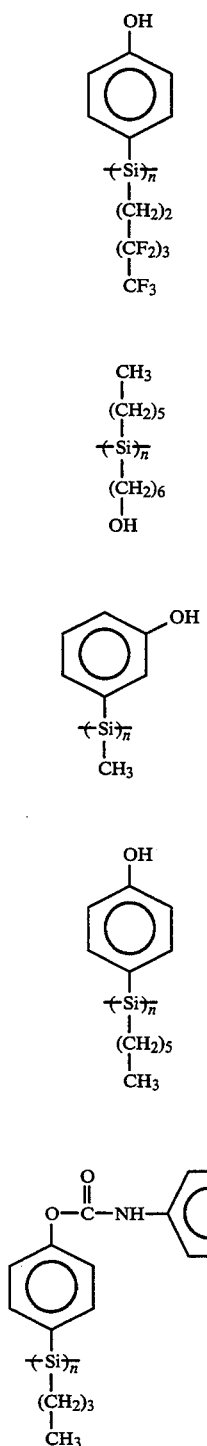
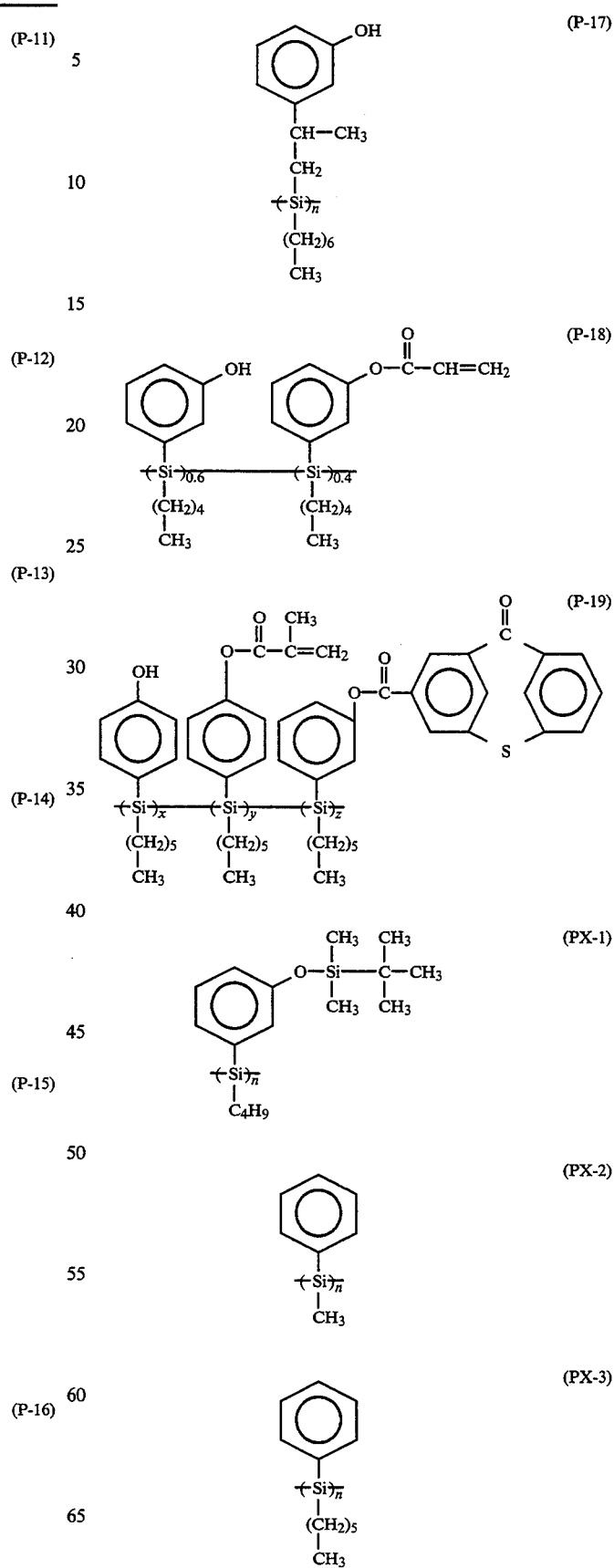

TABLE D-continued
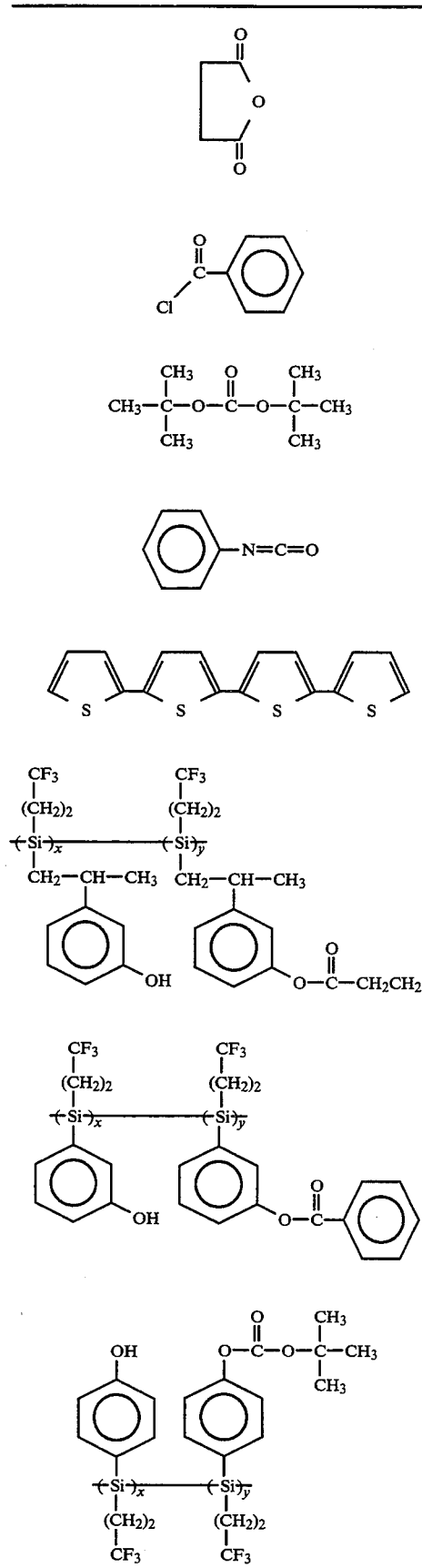
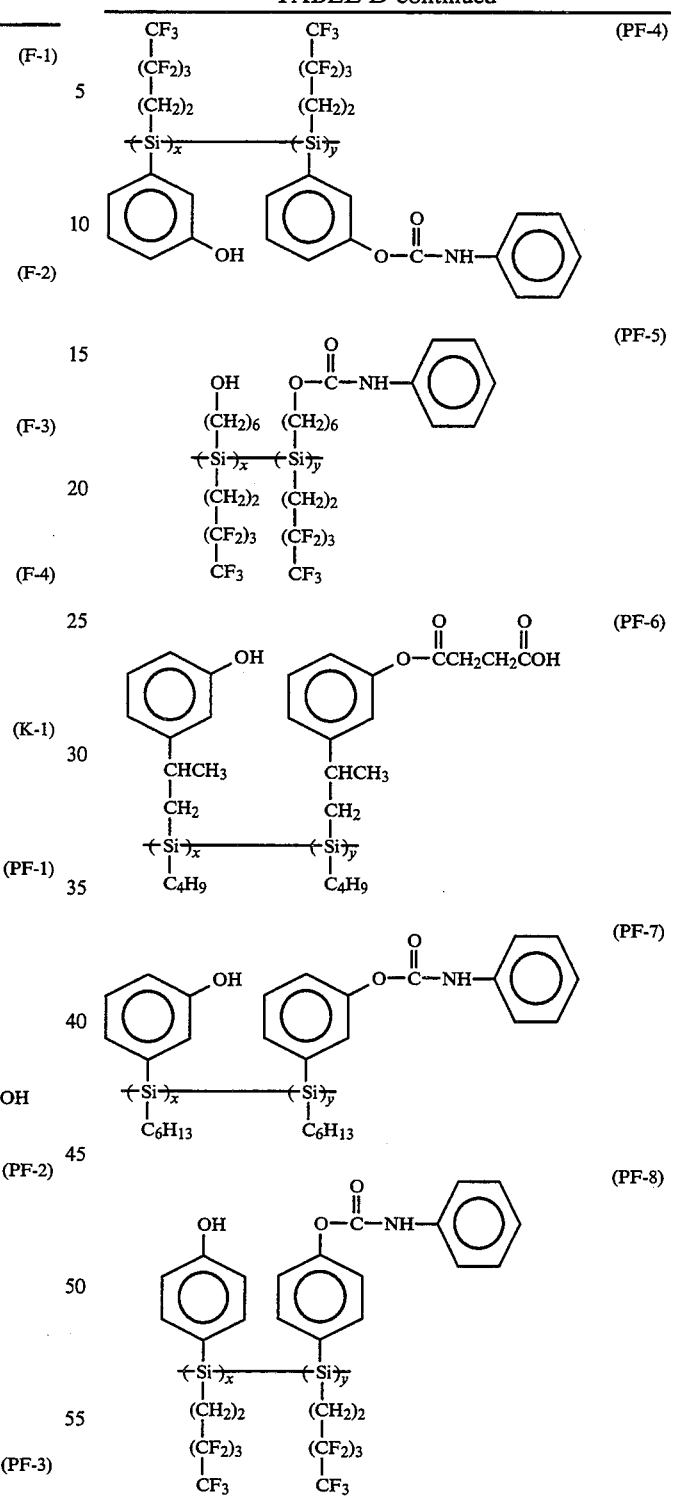
, where n represents a degree of polymerization;
and x, y, and z represent copolymer composition.
What is claimed is:
1. A polysilane monomolecular film, prepared by a Langmuir-Blodgett process, the improvement comprising dissolving in an organic solvent a polysilane having a repeating unit represented by formula (1) given below:

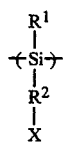

where R¹ represents a substituted or unsubstituted alkyl group having 1 to 24 carbon atoms or a substituted or unsubstituted aryl group having 6 to 24 carbon atoms;

R² represents a divalent hydrocarbon group having 1 to 24 carbon atoms which can be substituted; and X represents a hydroxyl group, an amino group, or a carboxyl group.

2. A polysilane monomolecular film, prepared by a Langmuir-Blodgett process, the improvement comprising dissolving in an organic solvent a polysilane having a repeating unit represented by formula (1) given below:

where R¹ represents a substituted or unsubstituted alkyl group having 1 to 24 carbon atoms or a substituted or unsubstituted aryl group having 6 to 24 carbon atoms;

R² represents a divalent hydrocarbon group having 1 to 24 carbon atoms which can be substituted; and X represents a hydrophilic moiety having at least one hydrophilic group selected from the group consisting of a hydroxyl group, an amino group, a carboxyl group, an amide linkage, an ester linkage, a carbamate linkage and a carbonate linkage.

3. The polysilane monomolecular film of claim 2, wherein each of said amide linkage, ester linkage, carbamate linkage and carbonate linkage links said divalent hydrocarbon group to a moiety selected from the group consisting of carboxymethyl, 2-carboxyethyl, carboxyvinyl, 2-carboxyphenyl, 2-carboxypro-2-pen-1-yl, 3-carboxyprop-1-en-2-yl, 2-carboxycyclohexyl, 2-carboxycyclohex-4-enyl, 2-carboxy-4-methylcyclohex-4-enyl, methyl, ethyl, t-butyl, hexyl, 2-(N-phenylcarboxamido)ethyl, phenyl, tolyl, 3,5-xylyl, vinyl, prop-2-en-2-yl, 3,4-epoxycyclohexyl, 3,4-epoxycyclohexylmethyl, 2,3-epoxypropyl, 3,4-epoxybutyl, β-(p-tolyl)vinyl, 3,5-bis(trifluoromethyl)phenyl, p-(N-maleimidyl)phenyl, N,N-dimethylanilinyl, dinitrophenyl, 3'-(N-methylphenothiazinyl)propyl, 2'-(tetracyanoquinodimethanyl)ethyl, phthalocyanine, fluoromethyl, chloromethyl, bromomethyl, iodomethyl, dichloromethyl, trifluoromethyl, trichloromethyl, tribromomethyl, 2-chloroethyl, 2,2,2-trifluoroethyl, 3,3,3-trichloropropyl, and a group of the formula

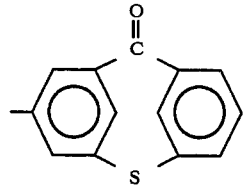

4. The polysilane monomolecular film of claim 1, wherein R¹ represents an unsubstituted alkyl group having 1 to 7 carbon atoms; R² represents a phenylene group, a (2'-phenylene)propylene group or a hexamethylene group; and X represents a hydroxyl group.

5. The polysilane monomolecular film of claim 3, wherein R¹ represents a methyl, ethyl, t-butyl or hexyl group; R² represents a phenylene group or a (2'-phenylene)propylene group; and X represents a hydrophilic moiety selected from the group consisting of an ester linkage which links R² to a carboxyethyl group, a vinyl group, or a group of the formula

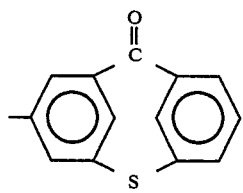

and a carbamate linkage which links R² to a phenyl or 2'-propenyl group.

6. The polysilane monomolecular film of claim 1, wherein said repeating unit is selected from the group consisting of:

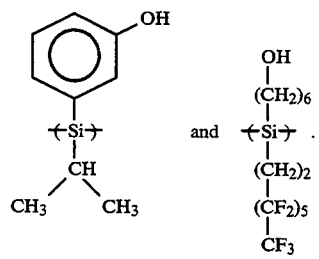

7. The polysilane monomolecular film of claim 1, wherein said polysilane has repeating units of the formulae:

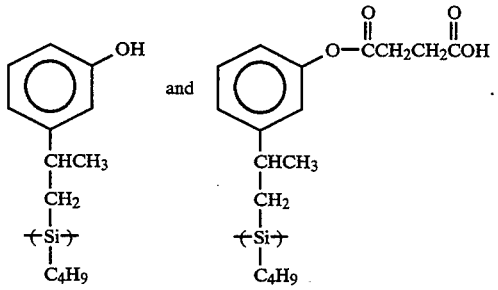

8. The polysilane monomolecular film of claim 1, wherein said polysilane has repeating units of the formulae:

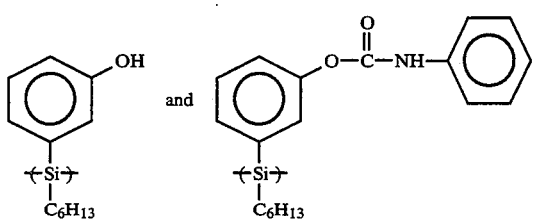

9. A coated substrate, prepared by transferring the polysilane monomolecular film prepared by the process of claim 1 or 4 onto a substrate.

10. The coated substrate of claim 9 wherein $R^1$ is a substituted or unsubstituted alkyl group having 4 to 24 carbon atoms.

11. The coated substrate of claim 9 wherein a fluorine atom or an fluorine-containing group is substituted for at least one hydrogen atom in $R^1$.

12. The polysilane monomolecular film of claim 1 or 2, wherein said polysilane is synthesized by a process comprising the steps of:

reacting, in an organic solvent, metallic sodium with a dichlorosilane of a formula selected from the group consisting of:

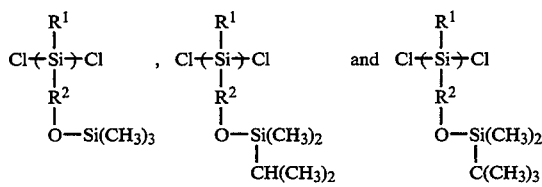

where $R^1$ represents a substituted or unsubstituted alkyl group having 1 to 24 carbon atoms or a substituted or unsubstituted aryl group having 6 to 24 carbon atoms; $R^2$ represents a divalent hydrocarbon group having 1 to 24 carbon atoms which can be substituted; and

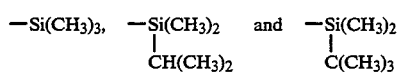

represent a protective group; and
hydrolyzing the protective group.

13. A substrate coated with a polysilane built-up film, prepared by successively transferring the polysilane monomolecular film prepared by the process of claim 1 or 2 onto a substrate.

14. The coated substrate of claim 13 wherein $R^1$ is a substituted or unsubstituted alkyl group having 4 to 24 carbon atoms.

15. The coated substrate of claim 13 wherein a fluorine atom or an fluorine-containing group is substituted for at least one hydrogen atom in $R^1$.

16. The polysilane built-up film of claim 13, wherein said polysilane is synthesized by a process comprising the steps of:

reacting, in an organic solvent, metallic sodium with a dichlorosilane of a formula selected from the group consisting of:

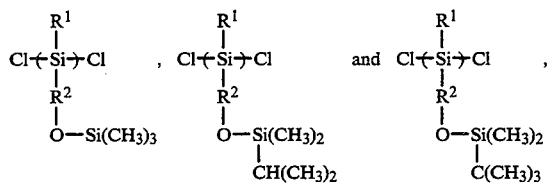

where $R^1$ represents a substituted or unsubstituted alkyl group having 1 to 24 carbon atoms or a substituted or unsubstituted aryl group having 6 to 24 carbon atoms; $R^2$ represents a divalent hydrocarbon group having 1 to 24 carbon atoms which can be substituted; and

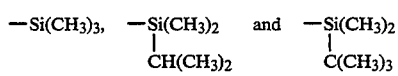

represent a protective group; and
hydrolyzing the protective group.

17. The polysilane monomolecular film of claim 13, wherein said polysilane has repeating units of the formulae:

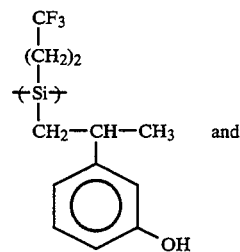

18. The polysilane monomolecular film of claim 13, wherein said polysilane has repeating units of the formulae:

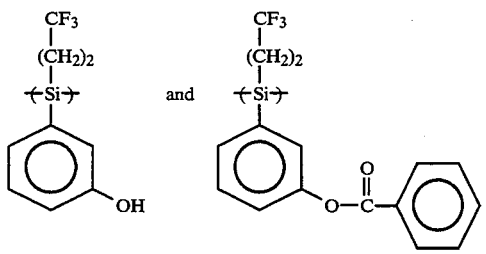

19. The polysilane monomolecular film of claim 13, wherein said polysilane has repeating units of the formulae:

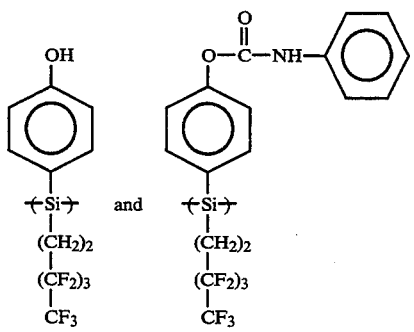

20. The polysilane monomolecular film of claim 13, wherein said polysilane has repeating units of the formulae:

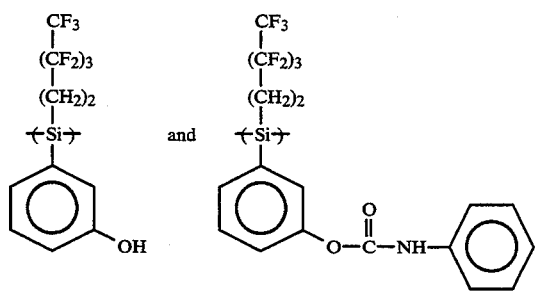

21. The polysilane monomolecular film of claim 13, wherein said polysilane has repeating units of the formulae:

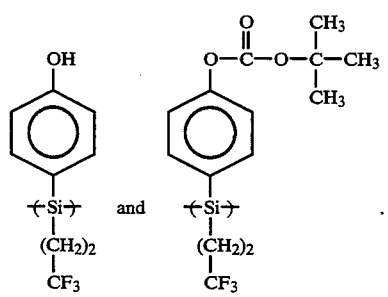

22. The polysilane monomolecular film of claim 13, wherein said polysilane has repeating units of the formulae:

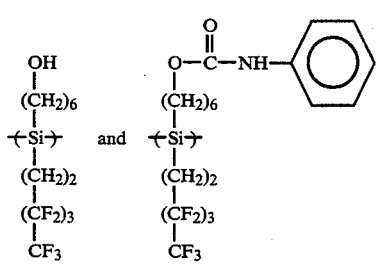

23. A polysilane built-up film comprising a plurality of successive polysilane monomolecular films, wherein each of said polysilane monomolecular films is the polysilane monomolecular film of claim 13.

24. A polysilane built-up film comprising a plurality of successive polysilane monomolecular films, each of said monomolecular films being prepared by a Langmuir-Blodgett process, the improvement comprising dissolving in an organic solvent a polysilane having a repeating unit represented by formula (1) given below:

where $R^1$ represents a substituted or unsubstituted alkyl group having 1 to 24 carbon atoms or a substituted or unsubstituted aryl group having 6 to 24 carbon atoms;

$R^2$ represents a divalent hydrocarbon group having 1 to 24 carbon atoms which can be substituted; and X represents a hydrophilic moiety having at least one hydrophilic group selected from the group consisting of a hydroxyl group, an amino group, a carboxyl group, an amide linkage, an ester linkage, a carbamate linkage and a carbonate linkage.

25. The polysilane built-up film of claim 24, wherein each of said amide linkage, ester linkage, carbamate linkage and a carbonate linkage links said divalent hydrocarbon group to a moiety selected from the group consisting of carboxymethyl, 2-carboxyethyl, carboxyvinyl, 2-carboxyphenyl, 2-carboxyprop-2-en-1-yl, 3-carboxyprop-1-en-2-yl, 2-carboxycyclohexyl, 2-carboxycyclohex-4-enyl, 2-carboxy-4-methylcyclohex-4-enyl, methyl, ethyl, t-butyl, hexyl, 2-(N-phenylcarboxamido)ethyl, phenyl, tolyl, 3,5-xylyl, vinyl, prop-2-en-2-yl, 3,4-epoxycyclohexyl, 3,4-epoxycyclohexylmethyl, 2,3-epoxypropyl, 3,4-epoxybutyl, β-(p-tolyl)vinyl, 3,5-bis(-trifluoromethyl)phenyl, p-(N-maleimidyl)phenyl, N,N-dimethylanilinyl, dinitrophenyl, 3'-(N-methylphenothiazinyl)-propyl, 2'-(tetracyanoquinodimethanyl)ethyl, phthalocyanine, fluoromethyl, chloromethyl, bromomethyl, iodomethyl, dichloromethyl, trifluoromethyl, trichloromethyl, tribromomethyl, 2-chloroethyl, 2,2,2-trifluoroethyl, 3,3,3-trichloropropyl, and a group of the formula

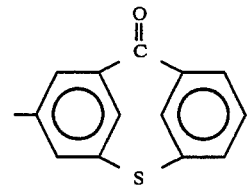

26. The polysilane built-up film of claim 24, wherein R represents an unsubstituted alkyl group having 1 to 7 carbon atoms; $R^2$ represents a phenylene group, a (2'-phenylene)propylene group or a hexamethylene group; and X represents a hydroxyl group.

27. The polysilane built-up film of claim 24, wherein $R^1$ represents an unsubstituted alkyl group having 1 to 6 carbon atoms; $R^2$ represents a phenylene group or a (2'-phenylene)propylene group; and X represents a hydrophilic moiety selected from the group consisting of an ester linkage which links $R^2$ to a 2-carboxyethyl group, a vinyl group, or a group of the formula

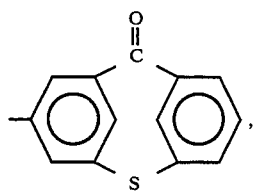

and a carbamate linkage which links R² to a phenyl or 2'-propenyl group.

28. The polysilane built-up film of claim 24, wherein said repeating unit is selected from the group consisting of:

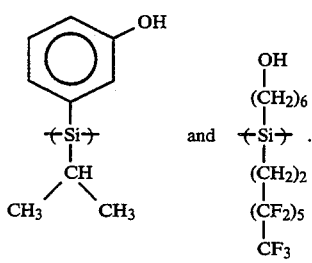

29. The polysilane built-up film of claim 24, wherein said polysilane has repeating units of the formula:

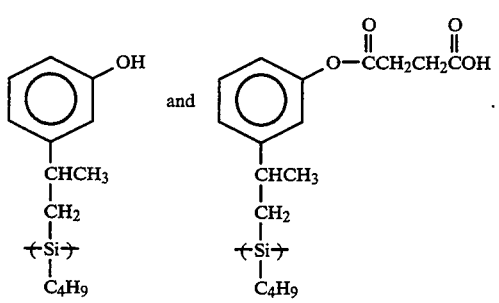

30. The polysilane built-up film of claim 24, wherein said polysilane has repeating units of the formula:

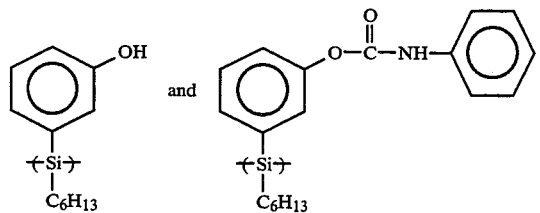

31. The polysilane built-up film of claim 24, wherein said polysilane has repeating units of the formulae:

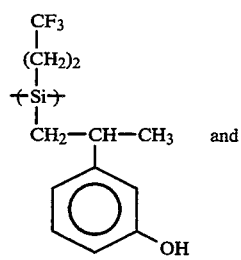

32. The polysilane built-up film of claim 24, wherein said polysilane has repeating units of the formulae:

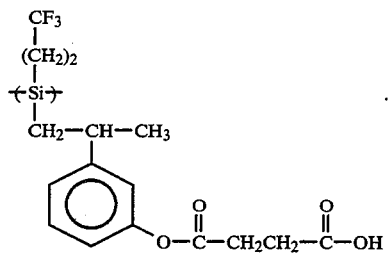

33. The polysilane built-up film of claim 24, wherein said polysilane has repeating units of the formulae:

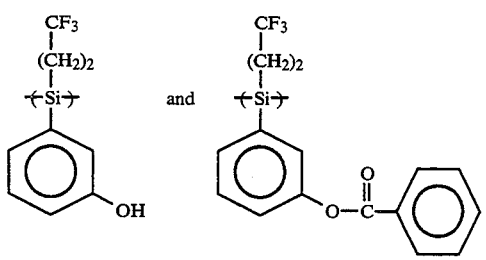

34. The polysilane built-up film of claim 24, wherein said polysilane has repeating units of the formulae:

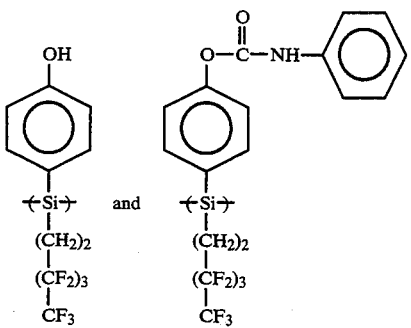

35. The polysilane built-up film of claim 24, wherein said polysilane has repeating units of the formulae:

36. The polysilane built-up film of claim 24, wherein said polysilane has repeating units of the formulae:

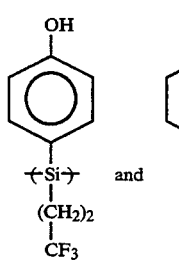 and 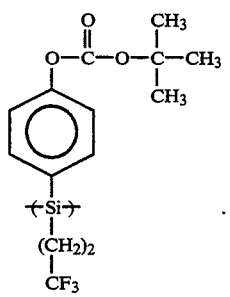

37. A polysilane built-up film comprising a plurality of successive polysilane monomolecular films, each of said monomolecular films being prepared by a Langmuir-Blodgett process, the improvement comprising dissolving in an organic solvent a polysilane having a repeating unit represented by formula (1) given below:

where $R^1$ represents a substituted or unsubstituted alkyl group having 1 to 24 carbon atoms or a substituted or unsubstituted aryl group having 6 to 24 carbon atoms;
$R^2$ represents a divalent hydrocarbon group having 1 to 24 carbon atoms which can be substituted; and
X represents a hydroxyl group, an amino group, or a carboxyl group.

38. The polysilane built-up film of claim 23 or 24, wherein said polysilane is synthesized by a process comprising the steps of:
reacting, in an organic solvent, metallic sodium with a dichlorosilane of a formula selected from the group consisting of:

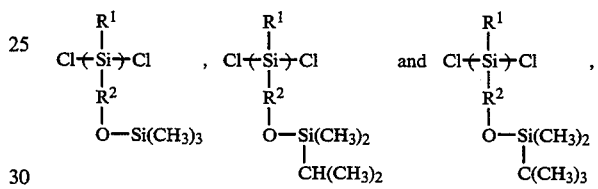

where $R^1$ represents a substituted or unsubstituted alkyl group having 1 to 24 carbon atoms or a substituted or unsubstituted aryl group having 6 to 24 carbon atoms; $R^2$ represents a divalent hydrocarbon group having 1 to 24 carbon atoms which can be substituted; and

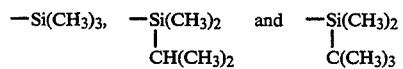

represent a protective group; and
hydrolyzing the protective group.

* * * * *